US008866905B2

(12) United States Patent
Yamamoto et al.

(10) Patent No.: US 8,866,905 B2
(45) Date of Patent: Oct. 21, 2014

(54) SURROUNDINGS MONITORING DEVICE FOR A VEHICLE

(75) Inventors: Kinji Yamamoto, Anjo (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 350 days.

(21) Appl. No.: 12/728,477

(22) Filed: Mar. 22, 2010

(65) Prior Publication Data

US 2010/0245577 A1  Sep. 30, 2010

(30) Foreign Application Priority Data

Mar. 25, 2009  (JP) .................................. 2009-074667

(51) Int. Cl.
*H04N 7/18*  (2006.01)

(52) U.S. Cl.
USPC .......................................... 348/148; 348/116

(58) Field of Classification Search
USPC .......................................... 348/148, 36, 116
See application file for complete search history.

(56) References Cited

U.S. PATENT DOCUMENTS

| | | | | |
|---|---|---|---|---|
| 5,959,555 | A * | 9/1999 | Furuta ............................ | 340/937 |
| 6,320,612 | B1 * | 11/2001 | Young ............................ | 348/148 |
| 6,476,855 | B1 * | 11/2002 | Yamamoto ..................... | 348/148 |
| 7,145,519 | B2 * | 12/2006 | Takahashi et al. ............. | 345/7 |
| 7,248,283 | B2 * | 7/2007 | Takagi et al. .................. | 348/118 |
| 7,295,229 | B2 * | 11/2007 | Kumata et al. ................ | 348/148 |
| 7,365,653 | B2 * | 4/2008 | Yang et al. ..................... | 340/988 |
| 7,502,048 | B2 * | 3/2009 | Okamoto et al. .............. | 348/148 |
| 7,518,490 | B2 * | 4/2009 | Takenaga et al. .............. | 340/435 |
| 7,576,767 | B2 * | 8/2009 | Lee et al. ........................ | 348/36 |
| 7,728,879 | B2 * | 6/2010 | Ishii ............................... | 348/222.1 |

(Continued)

FOREIGN PATENT DOCUMENTS

| | | |
|---|---|---|
| DE | 10 2008 034 606 A1 | 1/2010 |
| JP | 2003-204547 A | 7/2003 |

(Continued)

OTHER PUBLICATIONS

European Search Report issued in European Application No. 10156874.9-1523 dated Jun. 30, 2010 (7 pages).

(Continued)

*Primary Examiner* — Madhu Woolcock
(74) *Attorney, Agent, or Firm* — Sughrue Mion, PLLC

(57) ABSTRACT

A surroundings monitoring device for a vehicle, includes a pair of side cameras, each of which is provided at a side mirror, obtaining capture images capturing views extending to left and right of the vehicle including views below the side mirrors, respectively, an image graphic generating portion generating an image graphic of the vehicle from a view point above a rear portion thereof towards a front lower portion thereof, or from a view point above a front portion of the vehicle towards a rear lower portion thereof in order to include at least a portion of the vehicle and the side mirrors on the image graphic, and a side image generating portion generating left and right side images on the basis of the capture images so as to correspond to images shown at left and right portions of the image graphic displayed on a monitor, respectively.

7 Claims, 6 Drawing Sheets

(56) References Cited

U.S. PATENT DOCUMENTS

| | | | |
|---|---|---|---|
| 2002/0167589 A1* | 11/2002 | Schofield et al. | 348/148 |
| 2003/0021490 A1* | 1/2003 | Okamoto et al. | 382/284 |
| 2003/0095182 A1* | 5/2003 | Imoto | 348/148 |
| 2004/0046889 A1* | 3/2004 | Imoto | 348/335 |
| 2005/0057651 A1* | 3/2005 | Imoto et al. | 348/148 |
| 2005/0174429 A1* | 8/2005 | Yanai | 348/148 |
| 2006/0227138 A1* | 10/2006 | Oizumi | 345/428 |
| 2006/0274147 A1* | 12/2006 | Chinomi et al. | 348/118 |
| 2006/0287825 A1* | 12/2006 | Shimizu et al. | 701/216 |
| 2007/0057816 A1* | 3/2007 | Sakakibara et al. | 340/932.2 |
| 2008/0246843 A1* | 10/2008 | Nagata et al. | 348/148 |
| 2009/0009604 A1* | 1/2009 | Kanaoka et al. | 348/148 |
| 2009/0073263 A1* | 3/2009 | Harada et al. | 348/148 |
| 2009/0097708 A1* | 4/2009 | Mizuta | 382/103 |
| 2009/0257659 A1 | 10/2009 | Suzuki et al. | |
| 2010/0110189 A1 | 5/2010 | Kuboyama et al. | |
| 2010/0220189 A1* | 9/2010 | Yanagi | 348/148 |

FOREIGN PATENT DOCUMENTS

| | | |
|---|---|---|
| JP | 2003-346189 A | 12/2003 |
| JP | 3916958 B2 | 2/2007 |
| JP | 2007-089081 A | 4/2007 |
| JP | 2007-158426 A | 6/2007 |
| JP | 2007-210458 A | 8/2007 |
| JP | 2007-237785 A | 9/2007 |
| JP | 2009-12652 A | 1/2009 |
| WO | 2007/129582 A1 | 11/2007 |

OTHER PUBLICATIONS

Liu, Yu-Chin, et al., "Bird's Eye View Vision System for Vehicle Surrounding Monitoring" Robot Vision; [Lecture Notes in Computer Science]; Springer Berlin Heidelberg, Berlin, Heidelberg, Feb. 18, 2008, pp. 207-218, XP019086912 ISBN: 978-3-540-78156-1.

Office Action dated Apr. 25, 2013 in corresponding Japanese Patent Application No. 2009-074667.

* cited by examiner

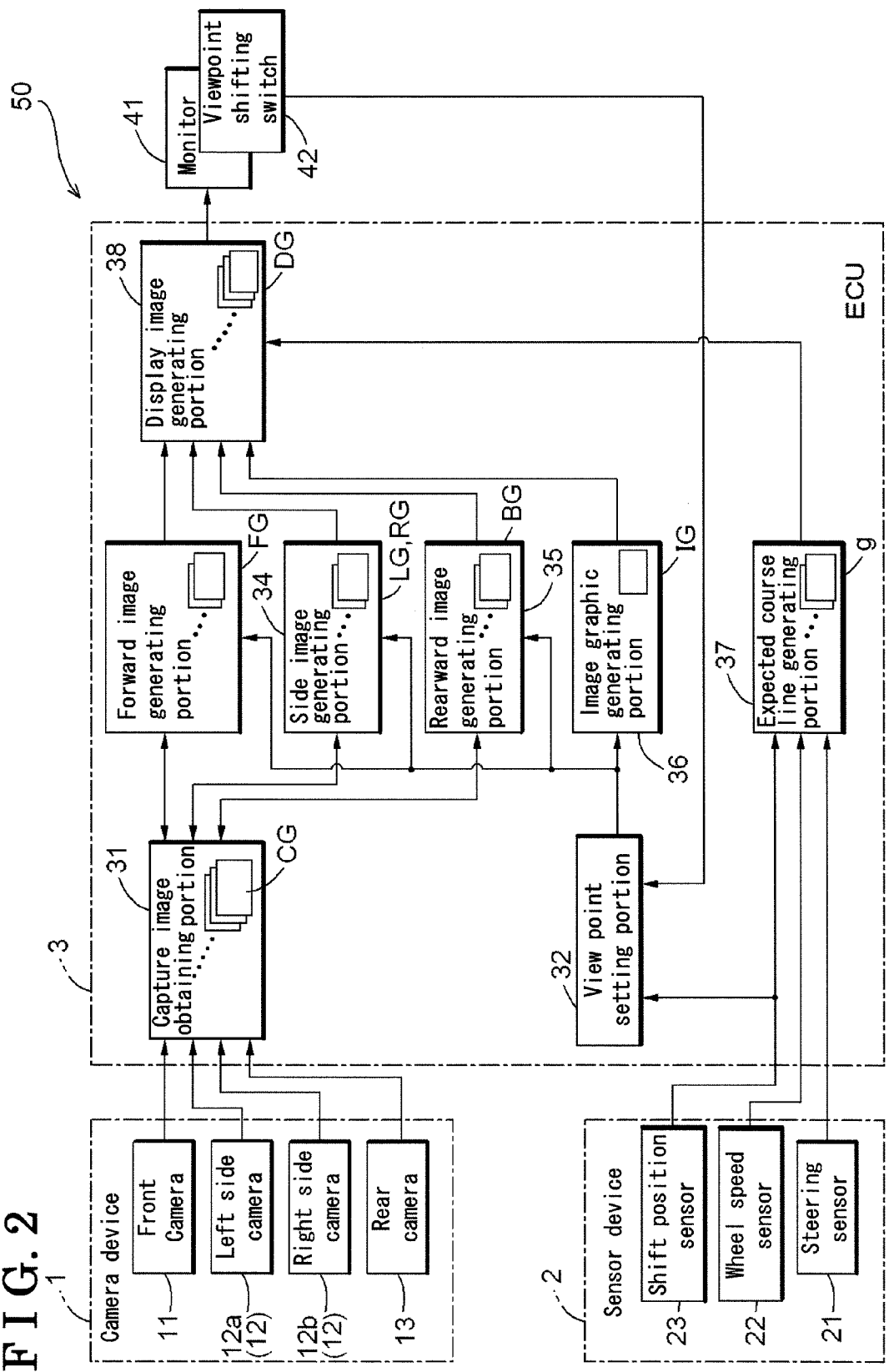

FIG. 3A  FIG. 3B  FIG. 3C
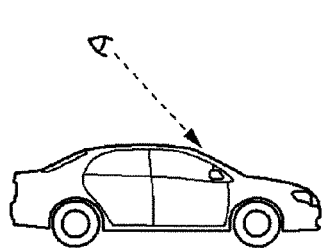
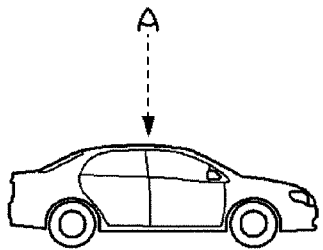
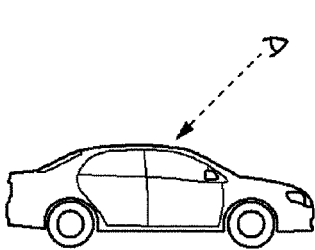
FIG. 4
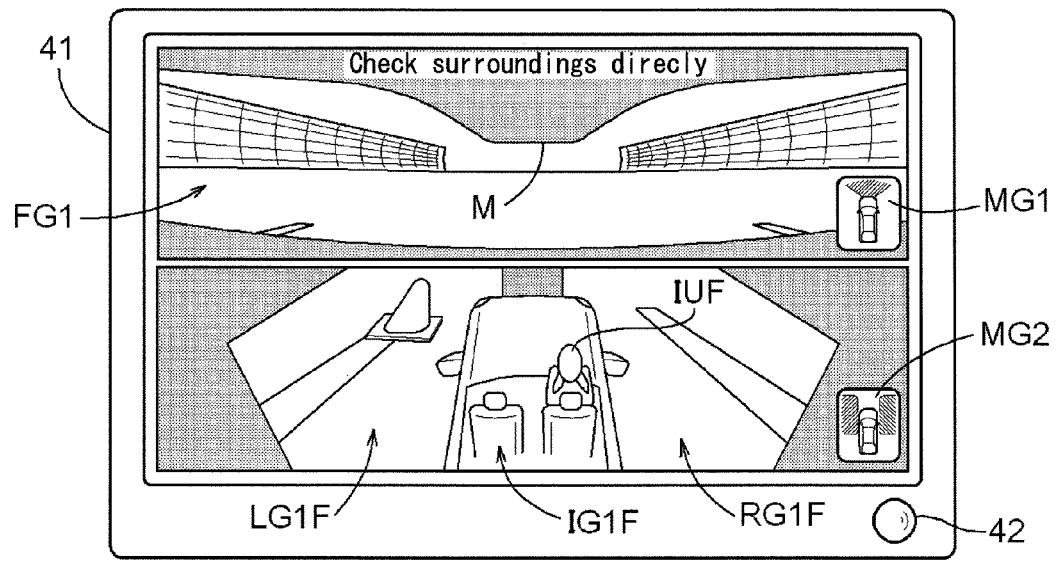

SURROUNDINGS MONITORING DEVICE FOR A VEHICLE

CROSS REFERENCE TO RELATED APPLICATIONS

This application is based on and claims priority under 35 U.S.C. §119 to Japanese Patent Application 2009-074667, filed on Mar. 25, 2009, the entire content of which is incorporated herein by reference.

TECHNICAL FIELD

This disclosure relates to a surroundings monitoring apparatus for a vehicle for monitoring surroundings of the vehicle.

BACKGROUND

Generally, a vehicle includes a side-view mirror and a rear-view mirror in order to enable a driver to confirm circumstances around the vehicle. However, there exists a blind area (i.e. an area out of driver's vision) where the driver may not see from a driver seat even by using the side-mirror or the rear-view mirror because of a structure of the vehicle. In order to minimize the blind area, there exists a vehicle that includes an additional mirror at a vehicle body (e.g. in the vicinity of a hood (bonnet) or in the vicinity of a rear gate). However, even by using such mirror provided at the vehicle body, it is not easy to clear the blind area completely. Furthermore, in the case where such mirror is provided at the vehicle body, a design of the vehicle may be deteriorated. Hence, a technology of enabling the driver to confirm the circumstances around the vehicle by using a capture image obtained by a camera and the like provided at the vehicle is suggested (e.g. "Around View Monitor", Technological Development Activities, NISSAN, http://www.nissan-global.com/EN/TECHNOLOGY/INTRODUCTION/DETAILS/AVM/, and "Multi-view Camera System", Press Information 2008, HONDA, Sep. 18, 2008, http://www.honda.co.jp/news/2008/4080918b.html).

According to the Around View Monitor of Nissan and the Multi-view Camera System of Honda, for example, in a case where the vehicle is rearwardly moved, a capture image capturing a rear view of the vehicle and a bird-eye image capturing areas around the vehicle are shown side-by-side in a right-and-left direction on a monitor provided at the vehicle. The bird-eye image is generated on the basis of capture images obtained by means of respective four cameras, which are provided at the vehicle.

According to the Around View Monitor of Nissan and the Multi-view Camera System of Honda, the bird-eye view is generated on the basis of the capture images captured by the respective four cameras. Therefore, a solid object included in the bird-eye image may be displayed as if the solid object is radially stretched with reference to a position of the camera capturing the image including the solid object. In other words, the solid object may be shown unnaturally on the bird-eye image. Furthermore, because the solid object is shown as if being radially stretched on the bird-eye image, a user may mistakenly perceive the solid object on the bird-eye image as an image drawn on a road surface. Therefore, the vehicle may contact the solid object if the driver does not perceive the solid object correctly. Additionally, according to the Around View Monitor of Nissan and the Multi-view Camera System of Honda, the capture images obtained by the respective four cameras are separately and independently shown on the monitor. Therefore, if an object exists at a border between the neighboring capture images, the object may not be shown on the monitor, which may confuse the user. Accordingly, a vehicle surroundings monitoring system and a method for adjusting the same disclosed in JP2003-204547A, a vehicle rear monitoring system and a monitoring device disclosed in JP 3916958B, and an image displaying device for a vehicle disclosed in JP2003-346189A are suggested.

The vehicle surroundings monitoring system disclosed in JP2003-204547A includes eight cameras at a vehicle. The vehicle surroundings monitoring system generates a bird-eye view covering the entire circumference of the vehicle on the basis of capture images obtained by the respective eight cameras. The cameras are provided at the vehicle so as to keep an angle, so that the solid object is shown to extend in the same direction at the border portion on the capture images in order to include a solid object, which exists at the border between covering areas of the neighboring cameras so as to vertically stand at the border, on the bird-eye image.

The vehicle rear monitoring system and the monitoring device disclosed in JP3916958B includes a rear-view camera for capturing a rear-view of the vehicle, and side-view cameras provided at right and left sides of the vehicle, respectively. The vehicle rear monitoring system generates a high angle image on the basis of a capture image captured by the rear-view camera. Then, the generated high angle image is combined with capture images obtained by the side-view cameras, thereby generating one image to be displayed on a monitor provided at the vehicle.

The image displaying device for the vehicle disclosed in JP2003-346189A is configured with plural cameras, which are provided at the vehicle. The image displaying device for the vehicle generates a projected image on the basis of capture images obtained by the respective cameras, so that the image on which the vehicle is projected from a viewpoint above the vehicle is created. Then, a graphic data, which describes the vehicle from a viewpoint above the vehicle, is superimposed on the generated projected image.

The vehicle surroundings monitoring system disclosed in JP2003-204547 may reduce a possibility of the solid object existing on the border between the neighboring camera covering areas being missed on the bird-eye image. However, because eight cameras are used for the vehicle surrounding monitoring system even though the bird-eye image covering all circumferences of the vehicle is sufficiently generated by four cameras, manufacturing costs of the vehicle surroundings monitoring system may increase. Furthermore, the solid object may still be shown as if being unnaturally stretched on the bird-eye view. Therefore, the user may mistakenly perceive the solid object shown on the bird-eye image as the image drawn on the road surface. Accordingly, the vehicle may contact the solid object if the driver does not perceive the solid object correctly.

According to the vehicle rear monitoring system disclosed in JP3916958B, each of the side-view cameras captures the side view as a view reflected on the side-view mirror, so that a lower portion of the high angle image displays a distant area. Therefore, in a case where the user shifts his/her attention from the high angle image to the images captured by the respective side-view cameras, the user may be confused because a moving direction of the vehicle is shown differently on the high angle image and the images captured by the respective side-view cameras. Furthermore, each of the side-view cameras is provided at the vehicle so as to face rearward of the vehicle. Therefore, in order to display front-end lateral portions of the vehicle, an additional side-view camera needs to be provided at each of the right and left sides of the vehicle, which may result in increasing the manufacturing costs.

The reference of JP2003-346189A discloses that the image displaying device for the vehicle displays the image viewed from above the vehicle. However, the reference of JP2003-346189A does not indicate or mention a method of displaying the image viewed from above the vehicle in detail.

According to the Around View Monitor of Nissan and the Multi-view Camera System of Honda, the rear view of the vehicle captured by the camera and the bird-eye image are displayed on the display side-by-side when the vehicle moves backward. A distant view in a moving direction of the vehicle is shown at an upper portion on the rear-view image. On the other hand, the distant view in the moving direction of the vehicle is shown at a lower portion on the bird-eye image. Therefore, because the moving direction of the vehicle is shown differently on the rear-view image and the bird-eye image, the user may be confused. As a result, the user may refer only to (look at) either the rear-view image or the bird-eye image.

A need thus exists to provide a surroundings monitoring device for a vehicle which is not susceptible to the drawback mentioned above.

SUMMARY

According to an aspect of this disclosure, a surroundings monitoring device for a vehicle, includes a pair of side cameras, each of which is provided at a side mirror of the vehicle, obtaining capture images capturing views extending to left and right of the vehicle including views below the side mirrors in a vertical direction, respectively, an image graphic generating portion generating an image graphic of the vehicle showing the vehicle being viewed from above a rear portion thereof towards a front lower portion thereof in order to include at least a portion of the vehicle and the side mirrors on the image graphic, or an image graphic of the vehicle showing the vehicle being viewed from above a front portion thereof towards a rear lower portion thereof in order to include at least a portion of the vehicle and the side mirrors on the image graphic, and a side image generating portion generating a left side image on the basis of the capture image capturing the view extending to the left relative to the vehicle so as to correspond to an image shown at a left portion of the image graphic displayed on a monitor, which is provided within a compartment of the vehicle, and generating a right side image on the basis of the capture image capturing the view extending to the right relative to the vehicle so as to correspond to an image shown at a right portion of the image graphic displayed on the monitor.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a block diagram schematically illustrating the surroundings monitoring device for the vehicle;

FIGS. 3A, 3B and 3C are diagrams for explaining a viewpoint;

FIG. 4 is a diagram illustrating an example of a display image in a case where the vehicle is viewed from obliquely above the vehicle while traveling forward;

DETAILED DESCRIPTION

Figure 1:
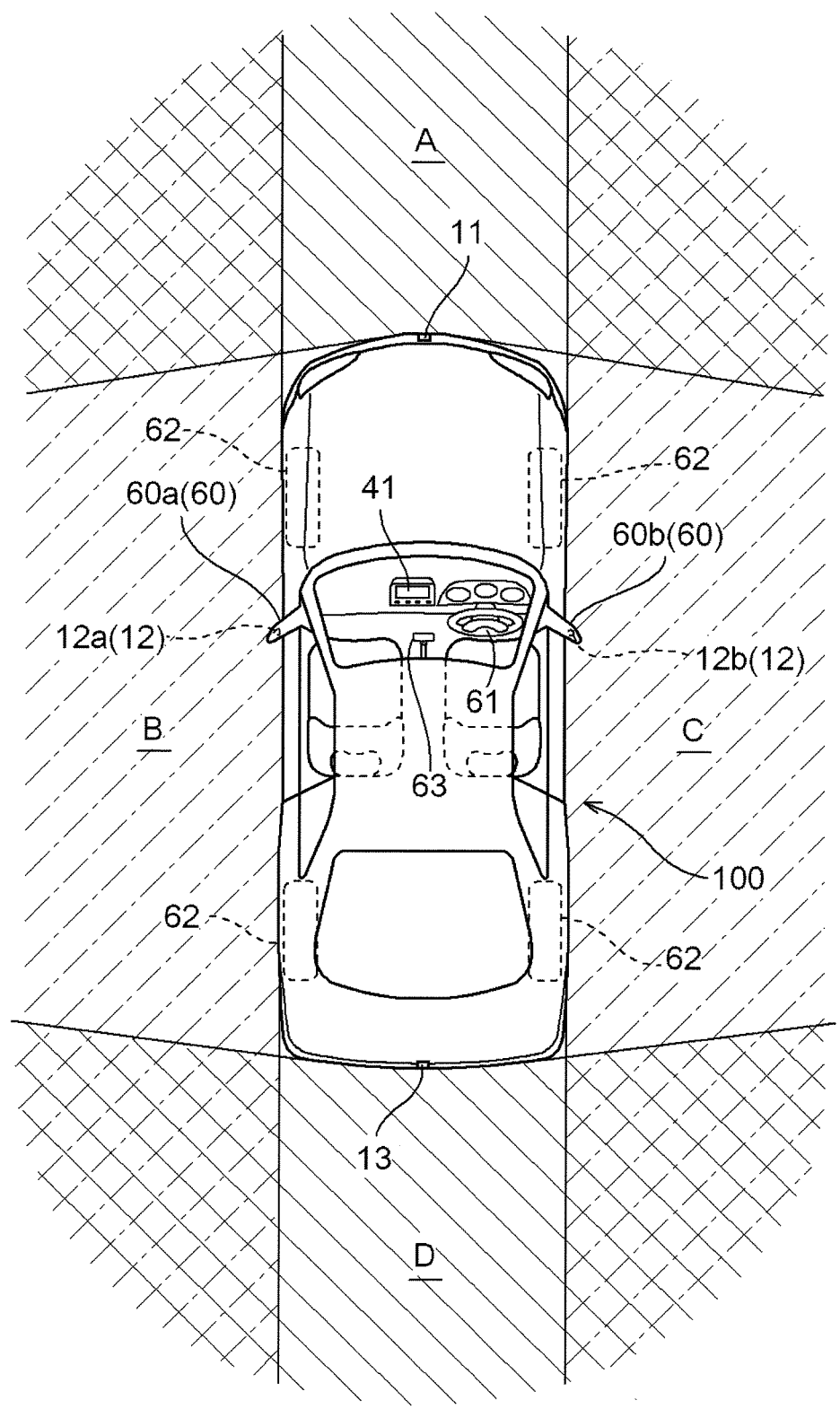
FIG. 1 is a diagram schematically illustrating a vehicle including a surroundings monitoring device for a vehicle according to an embodiment.

An embodiment of a surroundings monitoring device for a vehicle will be described below with reference to the attached drawings. Illustrated in FIG. 1 is a bird-eye view schematically illustrating a vehicle 100 having a surroundings monitoring device for vehicle 50 (which will be hereinafter referred to as a surroundings monitoring device 50). The surroundings monitoring device 50 includes a front camera 11, a side camera 12 (in this embodiment, two side cameras 12 are used), and a rear camera 13, which serve as camera devices 1 (an example of image capturing devices), which are provided at the vehicle 100. The front camera 11 obtains a capture image CG capturing a forward view relative to the vehicle 100 (i.e. a view extending forward relative to the vehicle 100). The front camera 11 is configured with, for example, a charge coupled device camera (i.e. a CCD camera). As illustrated in FIG. 1, the front camera 11 is provided at, for example, a front portion of the vehicle 100 (e.g. a radiator grill and the like). More specifically, the front camera 11 may be configured with, for example, a fisheye lens, so that the capture image CG including (covering) at least a view of an area indicated by "A" in FIG. 1 is obtained.

The side camera 12 is provided at a side mirror 60 of the vehicle 100. More specifically, the side camera 12 includes a pair of side cameras 12a and 12b (i.e. a left side camera 12a and a right side camera 12b). The left side camera 12a is provided at a left side mirror 60a (i.e. the side mirror provided at a left side of the vehicle 100 in a forwardly traveling direction of the vehicle 100) and obtains a capture image CG capturing a view extending to the left relative to the vehicle 100 including a view extending below the left side mirror 60a in a vertical direction. Similarly, the right side camera 12b is provided at a right side mirror 60b (i.e. the side mirror provided at a right side of the vehicle 100 in the forwardly traveling direction of the vehicle 100) and obtains a capture image CG capturing a view extending to the right relative to the vehicle 100 including a view extending below the right side mirror 60b in the vertical direction. In this embodiment, in a case where the side camera 12 does need to be specified whether to refer to the left side camera 12a or the right side camera 12b, the side cameras 12a and 12b will be described and explained as the side camera(s) 12.

The left side camera 12a captures the view extending to the left relative to the vehicle 100 (i.e. the left view) including the view extending below the left side mirror 60a in the vertical direction in order to obtain the capture image CG. As is the case with the front camera 11, the side cameras 12 may be configured with the fisheye lens, so that the capture image CG including (covering) at least a view of an area indicated by "B" in FIG. 1 is obtained by the left side camera 12a. The right side camera 12a captures the view extending to the right relative to the vehicle 100 (i.e. the right view) including the view extending below the right side mirror 60b in the vertical direction in order to obtain the capture image CG. Accordingly, the capture image CG capturing (covering) at least a view of an area indicated by "C" in FIG. 1 is obtained by the right side camera 12b.

The rear camera 13 obtains a capture image CG capturing a rear view relative to the vehicle 100 (i.e. a view extending rearwardly of the vehicle 100). As illustrated in FIG. 1, the rear camera 13 is provided at, for example, a rear portion of the vehicle 100 (e.g. a rear bumper, a mall and the like provided at the rear portion of the vehicle 100). The rear camera 13 may be configured with the fisheye lens, so that the capture image CG capturing (covering), at least, a view of an area indicated by "D" in FIG. 1 is obtained. As illustrated in FIG. 1, the areas (A, B, C and D) covered (captured) by the respective cameras (11, 12 and 13) are overlapped at border portions between the neighboring areas. Alternatively, the areas (A, B, C and D) covered by the respective cameras (11, 12 and 13) may be set to as not to overlap with each other.

The surroundings monitoring device 50 allows a user to properly monitor surroundings of the vehicle 100 by using the capture images CG, which are obtained by the respective front camera 11, the side cameras 12 and the rear camera 13 that are provided at the vehicle 100. Illustrated in FIG. 2 is a block diagram schematically illustrating a configuration of the surroundings monitoring device 50.

The surroundings monitoring device 50 further includes the camera device 1, a sensor device 2, an electronic control unit 3 (i.e. an ECU 3), a monitor 41, and a viewpoint shifting switch 42. The camera device 1 includes the front camera 11, the left side camera 12a, the right side camera 12b and the rear camera 13. The sensor device 2 includes a steering sensor 21, a wheel speed sensor 22 and a shift position sensor 23. The ECU 3 includes a capture image obtaining portion 31, a viewpoint setting portion 32, a forward image generating portion 33, a side image generating portion 34, a rearward image generating portion 35, an image graphic generating portion 36, an expected course line generating portion 37 and a display image generating portion 38, each of which serves as a functional portion. The surroundings monitoring device 50 having the above-described configuration executes various processing for monitoring the surroundings of the vehicle 100 with a center processing unit (CPU) as a core member. Therefore, each of the above-mentioned functional portions is built with a hardware or a software, alternatively by both of the hardware and the software.

The front camera 11 obtains the capture image CG capturing the view including at least the area A (see FIG. 1). The left side camera 12a obtains the capture image CG capturing the view including at least the area B (see FIG. 1). The right side camera 12b obtains the capture image CG capturing the view including at least the area C (see FIG. 1). Furthermore, the rear camera 13 obtains the capture image CG including at least the area D (see FIG. 1). The capture images CG captured by the respective cameras 11, 12 and 13 are transmitted to the capture image obtaining portion 31.

The steering sensor 21 detects a steering angle of a steering wheel 61 provided at the vehicle 100 (see FIG. 1). The steering angle corresponds to a rotational angle formed when the steering wheel 61 is rotated in a clockwise direction or in a counterclockwise direction from a neutral position. The neutral position (i.e. a neutral state) of the steering wheel 61 is a position (a state) thereof by which directions of steered wheels 62 (i.e. wheels 62, for example, front wheels 62) of the vehicle 100 become in parallel with a vehicle width, i.e. a position (a state) that allows the vehicle 100 to travel straight.

The steering sensor 21 for detecting the rotational angle of the steering wheel 61 may be configured with a hall element. The hall element detects a magnetic flux by using a hall effect that generates an electromotive force in response to a force acting on the hall element so as to move an electric charge within a conductor of the hall element in a lateral direction in a case where a magnetic field is applied to the conductor through which an electric current flows.

In the case where the hall element is used for the steering sensor 21, plural permanent magnets are provided so as to surround a rotating shaft of the steering wheel 61, so that the magnetic field that changes in response to a rotation of the steering wheel 61 is detected by the hall element. Additionally, a detection result is outputted from the hall element as an electric signal, so that the steering sensor 21 calculates the steering angle of the steering wheel 61 on the basis of the detection result. The steering angle calculated by the steering sensor 21 is transmitted to the expected course line generating portion 37 as a steering angle information.

The wheel speed sensor 22 detects a rotational speed of the wheel 62 of the vehicle 100 (see FIG. 1). As is the case with the steering sensor 21, the wheel speed sensor 22 may be configured with a hall element, so that the rotational speed of the wheel 62 is properly detected. More specifically, the wheel speed sensor 22 may be provided at a rotating shaft of each of a front-left wheel and a front-right wheel. Providing the wheel speed sensor 22 at the rotating shaft of each of the front-left wheel and the front-right wheel enables the ECU 3 to determine whether the vehicle 100 travels straight or turns. More specifically, in a case where the rotational speed of the front-left wheel coincides with the rotational speed of the front-right wheel, the ECU 3 determines that the vehicle 100 travels straight. On the other hand, in a case where the rotational speed of the front-left wheel differs from the rotational speed of the front-right wheel, the ECU 3 determines that the vehicle 100 turns towards either the front-left wheel or the front-right wheel whose rotational speed is lower than the other. In this embodiment, the wheel speed sensors 22 are provided at the rotating shafts of the front wheels, respectively. However, the wheel speed sensors 22 may be provided at rotating shaft of rear wheels of the vehicle 100, respectively, instead of providing the wheel speed sensors 22 at the front wheels, respectively. A detection result of the wheel speed detected by the corresponding wheel speed sensor 22 is transmitted to the expected course line generating portion 37.

The shift position sensor 23 detects a shift position of a gear lever 63 (see FIG. 1) of the vehicle 100. In this embodiment, the gear lever 63 is used as a lever for shifting gears provided at an automatic transmission mechanism. Generally, driving gears are fixed within the automatic transmission mechanism. Furthermore, either a P range used for parking the vehicle, an R range used for moving the vehicle rearwardly, a N range used for not transmitting a power from an engine to the driving gears in order to establish a free state within the transmission mechanism, a D range used when the vehicle 100 normally travels, a 2nd range for fixing a limit of shift-up up to a second gear speed when an engine brake is used while the vehicle 100 is traveling on an declined slope and the like, or a 1st range for establishing a first gear speed when a more powerful engine brake is used while the vehicle 100 is traveling on a steeply declined slope and the like is established within the automatic transmission mechanism. The automatic transmission mechanism is configured so that different levels of output voltage are outputted with respect to shift positions corresponding to the respective shift ranges. Accordingly, the shift position sensor 23 detects a current shift position of the gear lever 63 by detecting the output voltage. A detection result detected by the shift position sensor 23 is transmitted to the viewpoint setting portion 32 and the expected course line generating portion 37.

The capture image obtaining portion 31 obtains the capture images CG transmitted thereto from the respective cameras 11, 12 and 13. The capture images CG obtained by the capture image obtaining portion 31 are temporarily stored within a temporary storage area thereof, so that the capture images CG are read out (extracted) by the forward image generating portion 33, the side image generating portion 34 and the rearward image generating portion 35 when necessary. Additionally, the capture image obtaining portion 31 may be configured so that the capture images CG temporarily stored at the capture image obtaining portion 31 are deleted every predetermined period of time. Alternatively, a capacity of the temporary storage area may be set at a fixed value, so that the capture image CG is temporary stored and deleted in a first-in and first-out manner.

The viewpoint setting portion 32 sets a viewpoint of an image graphic IG of surroundings of the vehicle 100 (i.e. the view around the vehicle 100) or an image graphic IG of the vehicle 100, which is displayed on the monitor 41 provided within a compartment of the vehicle 100. The viewpoint is set on the basis of the detection result of the shift position of the gear lever 63 transmitted from the shift position sensor 23 to the viewpoint setting portion 32 or in response to an operation of the viewpoint shifting switch 43 by the user. For example, in the case where the viewpoint is set on the basis of the detection result of the shift position sensor 23, the viewpoint for forward movement is set while the gear lever 63 is positioned at, at least, forward moving shift positions, i.e. either at the D range, the 2nd range or the 1st range established within the automatic transmission mechanism. On the other hand, the viewpoint for rearward movement is set in a case where the gear lever 63 is positioned at, at least, a rearward moving shift position, i.e. at the R range established within the automatic transmission mechanism.

The surroundings monitoring device 50 is configured so that a view displayed on the monitor 41 is selectively switchable between a view showing surroundings of the vehicle 100 (i.e. the view around the vehicle 100) viewed from obliquely above the vehicle 100 so as to view the surroundings of the vehicle 100 in an obliquely downward direction and a view showing surroundings of the vehicle 100 (i.e. the view around the vehicle 100) viewed from vertically above the vehicle 100. The surroundings monitoring device 50 is configured so that the viewpoint is switchable on the basis of the operation of the viewpoint shifting switch 42 by the user. In this embodiment, the viewpoint from obliquely above the vehicle 100 is set as a default. Hence, in the case where the gear lever 63 is positioned at the forward moving shift position, the viewpoint setting portion 38 sets the viewpoint from obliquely above the vehicle 100 for the forward movement as the viewpoint. On the other hand, in the case where the gear lever 63 is positioned at the rearward moving shift position, the viewpoint setting portion 38 sets the viewpoint from obliquely above the vehicle 100 for the rearward movement as the viewpoint.

The viewpoint from obliquely above the vehicle 100 for the forward movement corresponds to a viewpoint illustrated by an arrow in FIG. 3A where the vehicle 100 is looked down from above a rear portion thereof towards a front lower portion thereof. When the user presses the viewpoint shifting switch 42, the viewpoint is switched from, for example, the viewpoint illustrated in FIG. 3A to a viewpoint illustrated by an arrow in FIG. 3B where the vehicle 100 is vertically looked down. The viewpoint from obliquely above the vehicle 100 for the rearward movement corresponds to a viewpoint illustrated by an arrow in FIG. 3C where the vehicle 100 is looked from above an upper portion thereof towards a rear lower portion thereof. When the user presses the viewpoint shifting switch 42, the viewpoint is switched from, for example, the viewpoint illustrated in FIG. 3C to the viewpoint illustrated in FIG. 3B where the vehicle 100 is vertically looked down as illustrated by the arrow. Information indicating the viewpoint set by the viewpoint setting portion 32 is transmitted to the forward image generating portion 33, the side image generating portion 34, the rearward image generating portion 35, the image graphic generating portion 36 and the expected course line generating portion 37.

The image graphic generating portion 36 generates the image graphic IG of the vehicle 100 based on the viewpoint set by the viewpoint setting portion 32. The image graphic IG includes an image graphic IG1F showing the vehicle 100 and the surroundings in the case where the vehicle 100 is looked down from above the rear portion of the vehicle 100 towards the front lower portion thereof as illustrated in FIG. 3A, an image graphic IG2 showing the vehicle 100 and the surroundings in the case where the vehicle 100 is looked down from above the vehicle 100 in the vertical direction as illustrated in FIG. 3B, and an image graphic IG1B showing the vehicle 100 and the surroundings in the case where the vehicle 100 is looked down from above the front portion of the vehicle 100 towards the rear lower portion thereof as illustrated in FIG. 3C. More specifically, in the case where the viewpoint from obliquely above the vehicle 100 is set as the viewpoint by the viewpoint setting portion 32, the image graphic generating portion 36 generates the image graphic IG1F of the vehicle 100, which is looked down from above the rear portion of the vehicle 100 towards the front lower portion thereof, so that at least a portion of the vehicle 100 and the side mirrors 60 are shown on the image graphic IG1F, or the image graphic IG1B of the vehicle 100, which is looked down from above the front portion of the vehicle 100 towards the rear lower portion thereof, so that at least a portion of the vehicle 100 and the side mirrors 60 are shown on the image graphic IG1B.

In the case where the viewpoint from obliquely above the vehicle 100 for the forward movement is set as the viewpoint by the viewpoint setting portion 32, the image graphic generating portion 36 generates the image graphic IG1F. The image graphic IG1F is generated so as to include at least the front portion of the vehicle 100 and the side mirrors 60. On the other hand, in the case where the viewpoint from obliquely above the vehicle 100 for the rearward movement is set as the viewpoint by the viewpoint setting portion 32, the image graphic generating portion 36 generates the image graphic IG1B. The image graphic IG1B is generated so as to include at least the rear portion of the vehicle 100 and the side mirrors 60. The image graphic IG generated by the image graphic generating portion 36 is transmitted to the display image generating portion 38.

The forward image generating portion 33 generates a forward image FG on the basis of the capture image CG obtained by the front camera 11 in the case where the gear lever 63 of the vehicle 100 is positioned at, at least, the forward moving shift position. The forward moving shift position indicates either the D range, the 2nd range or the 1st range established within the automatic transmission mechanism. The shift position sensor 23 determines whether or not the gear lever 63 is positioned at the forward moving shift position. The viewpoint setting portion 32 sets the viewpoint for forward movement as a viewpoint of an image displayed on the monitor 41 on the basis of the detection result of the shift position sensor 23.

The forward image FG includes a forward image FG1 obtained in the case where the vehicle 100 is looked down from above the rear portion of the vehicle 100 towards the front lower portion thereof as illustrated in FIG. 3A and a forward image FG2 obtained in the case where the vehicle 100 is looked down from above the vehicle 100 in the vertical direction as illustrated in FIG. 3B. When information indicating the viewpoint set by the viewpoint setting portion 32 is transmitted to the forward image generating portion 33, the forward image generating portion 33 reads out the capture image CG, which is obtained by means of the front camera 11 and which is temporarily stored within the capture image obtaining portion 31. The forward image generating portion 33 generates the forward image FG by using the read-out capture image CG so as to be properly displayed on the monitor 41. The forward image FG generated as described above is transmitted to the display image generating portion 38. The forward image FG will be described in more detail below.

The rearward image generating portion 35 generates a rearward image BG on the basis of the capture image CG obtained by the rear camera 13 in the case where the gear lever 63 of the vehicle 100 is positioned at, at least, the rearward moving shift position. The rearward moving shift position corresponds to the R range established within the automatic transmission mechanism. The shift position sensor 23 determines whether or not the gear lever 63 is positioned at the rearward moving shift position. The viewpoint setting portion 32 sets the viewpoint for the rearward movement as the viewpoint of the image to be displayed on the monitor 41 on the basis of the detection result of the shift position sensor 23.

The rearward image BG includes a rearward image BG1 obtained in the case where the vehicle 100 is looked down from above the front portion of the vehicle 100 towards the rear lower portion thereof as illustrated in FIG. 3C and a rearward image BG2 obtained in the case where the vehicle 100 is looked down from above in the vertical direction as illustrated in FIG. 3B. When the information indicating the viewpoint set by the viewpoint setting portion 32 is transmitted to the rearward image generating portion 35, the rearward image generating portion 35 reads out the capture image CG, which is obtained by the rear camera 13 and which is temporarily stored within the capture image generating portion 31. The rearward image generating portion 35 generates the rearward image BG by using the read-out capture image CG so as to be properly displayed on the monitor 41. The rearward image BG generated as described above is transmitted to the display image generating portion 38. The rearward image BG will be described in more detail below.

The side image generating portion 34 generates a left side image LG on the basis of the capture image CG capturing the view extending to the left from the vehicle 100 so as to correspond to an image shown at a left portion of the image graphic IG to be displayed on the monitor 41 of the vehicle 100, and a right side image RG on the basis of the capture image CG capturing the view extending to the right from the vehicle 100 so as to correspond to an image shown at a right portion of the image graphic IG to be displayed on the monitor 41. The capture image CG capturing the view extending to the left from the vehicle 100 indicates the capture image CG obtained by the left side camera 12a. The side image generating portion 34 reads out the capture image CG, which is obtained by the left side camera 12a and which is temporarily stored within the capture image obtaining portion 31, in any cases where the view extending to the left from the vehicle 100 is necessary without being influenced by whether the viewpoint for the forward movement or the rearward movement is set by the viewpoint setting portion 32.

The side image generating portion 34 generates the left side image LG on the basis of the read-out capture image CG obtained by the left side camera 12a so as to correspond to the view shown at the left portion of the image graphic IG to be displayed on the monitor 41. The image graphic IG to be displayed on the monitor 41 indicates the image graphic IG generated by the image graphic generating portion 36. The image shown at the left portion of the image graphic IG indicates the image shown at the left portion of the image graphic IG displayed on the monitor 41 without being influenced by whether the viewpoint for the forward movement or the rearward movement is set by the viewpoint setting portion 32. More specifically, the left side image LG corresponding to the image graphic IG indicates the left side image LG showing the vehicle 100 being looked down from above the front portion thereof towards the rear lower portion thereof in the case where the image graphic IG showing the vehicle 100 being looked down from above the front portion thereof towards the rear lower portion thereof is generated. On the other hand, in the case where the image graphic IG showing the vehicle 100 being looked down from above the rear portion thereof towards the front lower portion thereof is generated, the left side image LG showing the vehicle 100 from above the rear portion thereof towards the front lower portion thereof is generated as the left side image LG.

The capture image CG capturing the view extending to the right from the vehicle 100 indicates the capture image CG obtained by the right side camera 12b. The side image generating portion 34 reads out the capture image CG, which is obtained by the right side camera 12b and which is temporarily stored within the capture image generating portion 31, in any cases where the view extending to the right from the vehicle 100 is necessary without being influenced by whether the viewpoint for the forward movement or the rearward movement is set by the viewpoint setting portion 32. Then, the side image generating portion 34 generates the right side image RG on the basis of the read-out capture image CG obtained by the right side camera 12b so as to correspond to the image shown at the right portion of the image graphic IG to be displayed on the monitor 41. The image graphic IG displayed on the monitor 41 indicates the image graphic IG generated by the image graphic generating portion 36. The image at the right portion of the image graphic IG indicates the view of the right portion of the image graphic IG displayed on the monitor 41 without being influenced by whether the viewpoint for the forward movement or the rearward movement is set by the viewpoint setting portion 32. More specifically, the right side image RG corresponding to the image graphic IG indicates the right side image RG showing the vehicle 100 being looked down from above the front portion thereof towards the rear lower portion thereof in the case where the image graphic IG showing the vehicle 100 being looked down from above the front portion thereof towards the rear lower portion thereof is generated. On the other hand, in the case where the image graphic IG showing the vehicle 100 from the view point of looking down the vehicle 100 from above the rear portion thereof towards the front lower portion thereof is generated, the right side image RG showing the vehicle 100 being looked down from above the rear portion thereof towards the front lower portion thereof is generated.

The left side image LG includes a left side image LG1F obtained in the case where the vehicle 100 is looked down from above the rear portion thereof towards the front lower portion thereof as illustrated in FIG. 3A, a left side image LG2 obtained in the case where the vehicle 100 is looked down from above in the vertical direction as illustrated in FIG. 3B, and a left side image LG1B obtained in the case where the vehicle 100 is looked down from the front portion thereof towards the rear lower portion thereof as illustrated in FIG. 3C. Similarly, the right side image RG includes a right side image RG1F obtained in the case where the vehicle 100 is looked down from above the rear portion thereof towards the front lower portion thereof as illustrated in FIG. 3A, a right side image RG2 obtained in the case where the vehicle 100 is looked down from above in the vertical direction as illustrated in FIG. 3B, and a right side image RG1B obtained in the case where the vehicle 100 is looked down from the front portion thereof towards the rear lower portion thereof as illustrated in FIG. 3C.

Accordingly, the image graphic IG is displayed on the monitor 41 as a normal image (a non-reversed image) while the vehicle is traveling forward. On the other hand, while the vehicle is moved rearwardly, the image graphic IG is displayed on the monitor 41 as a mirror image (a reflected image). In other words, the image graphic IG is displayed on the monitor 41 as the mirror image in the case where the gear lever 63 is positioned at the rearward moving shift position. The left side image LG and the right side image RG generated by the side image generating portion 34 are transmitted to the display image generating portion 38.

The expected course line generating portion 37 generates an expected course line g, which is obtained by a calculation on the basis of the steering angle of the steering wheel 61, the wheel speeds of the wheels 62, and the shift position of the gear lever 63. The information of the steering angle of the steering wheel 61 is transmitted to the expected course line generating portion 37 from the steering sensor 21. The information of the wheel speeds are transmitted to the expected course line generating portion 37 from the wheel speed sensors 22. The information of the shift position of the gear lever 63 is transmitted to the expected course line generating portion 37 from the shift position sensor 23. The expected course line generating portion 37 generates the expected course line g by using the information of the steering angle, the wheel speed and the shift position. The surroundings monitoring device 50 is provided at the vehicle in order to avoid a contact of the vehicle 100 with an object existing around the vehicle 100. Therefore, for example, in a case where the vehicle is about to turn left while traveling forward, the expected course line generating portion 37 generates the expected course line g so as to show trajectories of a right front end portion of the vehicle 100 and a left rear end portion thereof. On the other hand, for example, in a case where the vehicle 100 is about to turn right while traveling forward, the expected course line generating portion 37 generates the expected course line g so as to show trajectories of a left front end portion of the vehicle 100 and a right rear end portion thereof. Furthermore, in a case where the vehicle 100 is about to turn left while traveling rearward, the expected course line generating portion 37 generates the expected course line g so as to show the trajectories of the right front end portion of the vehicle 100 and the left rear end portion thereof. On the other hand, in a case where the vehicle 100 is about to turn right while traveling rearward, the expected course line generating portion 37 generates the expected course line g so as to show the trajectories of the left front end portion of the vehicle 100 and the right rear end portion thereof. The expected course line generating portion 37 generates the expected course line g and transmits the information of the expected course line g to the display image generating portion 38.

The display image generating portion 38 generates a display image DG to be displayed on the monitor 41. Images serving as a basis of the display image DG are transmitted to the display image generating portion 38 from the forward image generating portion 33, the side image generating portion 34, the rearward image generating portion 35 and the image graphic generating portion 36. The display image generating portion 38 generates the display image DG by using the images transmitted thereto from the forward image generating portion 33, the side image generating portion 34, the rearward image generating portion 35 and the image graphic generating portion 36 so as to be properly displayed on the monitor 41. For example, in the case where the expected course line g is generated by the expected course line generating portion 37, the display image generating portion 38 generates the display image DG in which the expected course line g is superimposed on the images transmitted to the display image generating portion 38 from the forward image generating portion 33, the side image generating portion 34, the rearward image generating portion 35 and the image graphic generating portion 36. The display image generating portion 38 transmits the display image DG to the monitor 41.

The monitor 41 displays the display image DG, which is generated by the display image generating portion 38, in order to enable the user to confirm circumstances of the vehicle 100 by referring to the image displayed on the monitor 41.

The surroundings monitoring device 50 according to the embodiment will be described below by using the display image DG displayed on the monitor 41. Illustrated in FIG. 4 is an example of the display image DG obtained in the case where the viewpoint from obliquely above the vehicle 100 while traveling forward is set as the viewpoint. When the shift position of the gear lever 63 is determined to be at the forward moving shift position by means of the shift position sensor 23, the viewpoint setting portion 32 sets the viewpoint of looking down the vehicle 100 from above the rear portion thereof towards the front lower portion thereof (see FIG. 3A) as the viewpoint of the display image DG displayed on the monitor 41 in response to the detection result of the shift position sensor 23.

The image graphic generating portion 36 generates the image graphic IG (i.e. the image graphic IG1F in FIG. 4) of the vehicle 100 in response to the viewpoint set by the viewpoint setting portion 32, so that at least a portion of the vehicle 100 and the side mirrors 60 are shown on the image graphic IG. In this embodiment, an image IUF indicating the user is also generated on the image graphic IG1F, so that the user perceives a position of the vehicle 100 and a positional relationship between the vehicle 100 and the surroundings thereof more easily. In this case, the normal image of the vehicle 100 being looked down from behind the user towards the front lower portion of the vehicle 100 is generated as the image graphic IG1F. The image graphic IG1F (including the image IUF in the case where the image indicative of the use is generated) generated by the image graphic generating portion 36 is transmitted to the display image generating portion 38.

The forward image generating portion 33 reads out the capture image CG, which is captured by the front camera 11 and which is temporarily stored within the capture image generating portion 31, in response to the viewpoint set by the viewpoint setting portion 32 in order to generate the forward image FG (i.e. the forward image FG1 in FIG. 4) by using the read-out capture image CG. An upper middle area of the capture image CG obtained from the capture mage obtaining portion 31 may be hidden by means of a mask M, so that the user perceives that the forward image FG1 is displayed on the monitor 41 when the user looks at the monitor 41.

An overview image MG1 showing a miniturized entire vehicle 100 may be displayed (shown) in the vicinity of the forward image FG1 (e.g. a lower right area on the forward image FG1) in order to enable the user to easily recognize which area around the vehicle 100 is shown on the forward image FG1, which is displayed on the monitor 41. For example, an area extending forward relative to the vehicle 100 is emphasized with a color and the like on the overview image MG1 in FIG. 4. The information about the forward image FG1 generated by the forward image generating portion 33 is transmitted to the display image generating portion 38.

The side image generating portion 34 reads out the capture image CG, which is obtained by the left side camera 12a and which is temporarily stored within the capture image generating portion 31, in response to the viewpoint set by the viewpoint setting portion 32 in order to generate the left side image LG (i.e. the left side image LG1F in FIG. 4) by using the read-out capture image CG. Furthermore, the side image generating portion 34 reads out the capture image CG, which is captured by the right side camera 12b and which is temporarily stored within the capture image generating portion 31, in response to the viewpoint set by the viewpoint setting portion 32, in order to generate the right side image RG (i.e. the right side image RG1F in FIG. 4) by using the read-out capture image CG.

An overview image MG2 showing the miniturized entire vehicle 100 may be displayed (shown) on the monitor 41 in order to enable the user to easily recognize which area around the vehicle 100 is shown on the left side image LG1F and the right side image RG1F. For example, areas extending to the left and right from the vehicle 100 are emphasized with a color and the like on the overview image MG2 in FIG. 4.

The pair of the side cameras 12 are provided at the respective side mirrors 60 so as to face downward in the vertical direction. Therefore, the side camera 12 obtains the capture image CG so that an area below the side mirror 60 in the vertical direction is captured as a center of the capture image CG. Accordingly, if the side image generating portion 34 simply displays the capture images CG, which are obtained from the respective left side camera 12a and the right side camera 12b and which are read out from the capture image generating portion 31, on the monitor 41, the user may perceive the views displayed on the monitor 41 with awkwardness. Therefore, in this embodiment, the side image generating portion 33 generates the left side image LG1F and the right side image RG1F, in which the vehicle 100 is looked down from above the rear portion of the vehicle 100 towards the front lower portion thereof, on the basis of the capture images CG, which are read out from the capture image generating portion 31, in the case where the viewpoint of looking down the vehicle 100 from above the rear portion thereof towards the front lower end portion thereof is set as the viewpoint by the viewpoint setting portion 32. The left side image LG1F and the right side image RG1F may be generated by using a know image processing technology. Therefore, a detailed explanation of generation of the left side image LG1F and the right side image RG1F will be omitted here. The left side image LG1F and the right side image RG1F, which are generated by the side image generating portion 34 and which are images showing the vehicle 100 so as to be looked down from above the rear portion of the vehicle 100 towards the front lower portion thereof, are transmitted to the display image generating portion 38.

The display image generating portion 38 displays the image graphic IG1F, which is transmitted to the display image generating portion 38 from the image graphic generating portion 36 and which shows the vehicle 100 and the surroundings from the viewpoint of looking down the vehicle 100 from above the rear portion thereof towards the front lower portion thereof, the left side image LG1F and the right side image RG1F, which are transmitted to the display image generating portion 38 from the side image generating portion 34 and which show the vehicle 100 and the surroundings from the viewpoint of looking down the vehicle 100 from above the rear portion thereof towards the front lower portion thereof, and the forward image FG1, which is transmitted to the display image generating portion 38 from the forward image generating portion 33, on the monitor 41. More specifically, for example, the display image generating portion 38 displays the forward image FG1 above the image graphic IG1F, the left side image LG1F and the right side image RG1F on the monitor 41. Furthermore, the display image generating portion 38 generates the display image DG so that an upper end portion of the left side image LG1F and an upper end portion of the right side image RG1F displayed on the monitor 41 are overlapped with at least an area existing the closest to the vehicle 100 on the forward image FG1.

The upper end portions of the left side image LG1F and the right side image RG1F are upper end portions thereof when being displayed on the monitor 41. The area, which exists, at least, the closest to the vehicle 100 on the forward image FG1, corresponds to an area in the vicinity of a lower end portion on the forward image FG1 in FIG. 4. The display image generating portion 38 generates the display image DG so that the upper end portions of the left side image LG1F and the right side image RG1F are overlapped with the area in the vicinity of the lower end portion of the forward image FG1. In the case where the display image DG, which is generated as mentioned above, is displayed on the monitor 41, the forward image FG1, the left side image LG1F and the right side image RG1F are showed so that the moving direction of the vehicle 100 on each of the images coincides therebetween. Therefore, the left side image LG1F and the forward image FG1 are shown as sequential images. Furthermore, the right side image RG1F and the forward image FG1 are shown as sequential images. Accordingly, the user may smoothly shift his/her vision (attention) between images.

Figure 5:
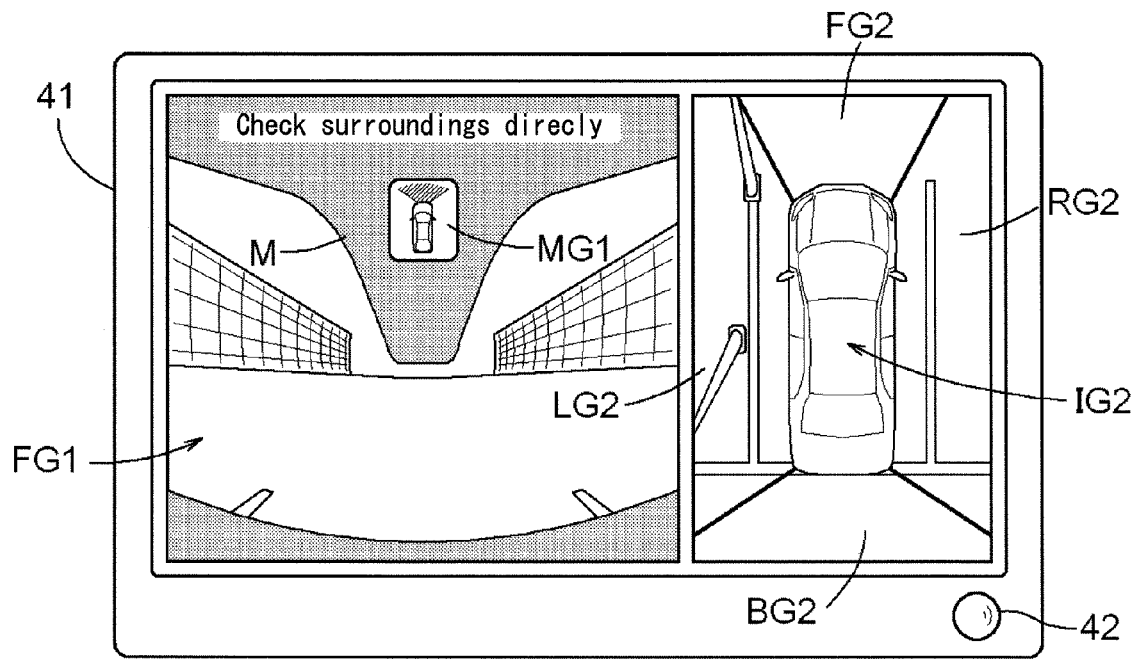
FIG. 5 is a diagram illustrating an example of a display image in a case where the vehicle is viewed from vertically above the vehicle while traveling forward.

According to the surroundings monitoring device 50 of the embodiment, the viewpoint is switchable from the viewpoint obliquely above the vehicle 100 as illustrated in FIG. 3A to the viewpoint above the vehicle 100 in the vertical direction as illustrated in FIG. 3B. The switching of the viewpoint may be achieved in response to the operation of the viewpoint shifting switch 42 by the user. For example, when the user presses the viewpoint shifting switch 42, the viewpoint setting portion 32 sets the viewpoint above the vehicle 100 in the vertical direction as the viewpoint of the display image DG to be displayed on the monitor 41. The viewpoint on the display image DG will be described in more detail below with reference to FIG. 5.

The image graphic generating portion 36 generates the image graphic IG of the vehicle 100 (i.e. the image graphic IG2 in FIG. 5) so that the vehicle 100 being looked down from above in the vertical direction is shown on the image graphic IG2 in response to the viewpoint set by the viewpoint setting portion 32. The image graphic IG2 generated by the image graphic generating portion 36 is transmitted to the display image generating portion 38.

The forward image generating portion 33 reads out the capture image CG, which is obtained by the front camera 11 and which is temporarily stored within the capture image generating portion 31, in response to the viewpoint set by the viewpoint setting portion 32 in order to generate the forward image FG (i.e. the forward image FG1 in FIG. 5) by using the read-out capture image CG. The upper middle area of the capture image CG obtained from the capture mage obtaining portion 31 may be hidden by means of the mask M, so that the user properly perceives that the forward image FG1 is displayed on the monitor 41 when the user looks at the monitor 41.

The overview image MG1 showing the minituarized entire vehicle 100 may be displayed (shown) in the vicinity of the forward image FG1 (e.g. at an upper area on the forward image FG1) in order to enable the user to easily recognize which area around the vehicle 100 is shown on the forward image FG1, which is displayed on the monitor 41. For example, the area extending forward relative to the vehicle 100 is emphasized with the color and the like on the overview image MG1 in FIG. 5. The forward image FG1 generated by the forward image generating portion 33 is transmitted to the display image generating portion 38.

The forward image generating portion 33 generates the forward image FG (i.e. the forward image FG2 in FIG. 5) in which the vehicle 100 is looked down from above in the vertical direction. The forward image FG2 is displayed above the image graphic IG2 of the vehicle 100 generated by the image graphic generating portion 36 on the monitor 41. The forward image FG2, which is generated by the forward image generating portion 33 and which shows the vehicle 100 and the surroundings so as to be looked down from above the vehicle 100 in the vertical direction, is transmitted to the display image generating portion 38.

The side image generating portion 34 reads out the capture image CG, which is obtained by the left side camera 12a and which is temporarily stored within the capture image obtaining portion 31, in response to the viewpoint set by the viewpoint setting portion 32, in order to generate the left side image LG (i.e. the left side image LG2 in FIG. 5) by using the read-out capture image CG. Furthermore, the side image generating portion 34 read out the capture image CG, which is obtained by the right side camera 12b and which is temporarily stored within the capture image obtaining portion 31, in response to the viewpoint set by the viewpoint setting portion 32, in order to generate the right side image RG (i.e. the right side image RG2 in FIG. 5) by using the read-out capture image CG. The left side image LG2, which is generated by the side image generating portion 34, is displayed on the left of the image graphic IG2 of the vehicle 100 generated by the image graphic generating portion 36. On the other hand, the right side image RG2, which is generated by the side image generating portion 34, is displayed on the right of the image graphic IG2. The left side image LG2 and the right side image RG2, which are generated by the side image generating portion 34, are transmitted to the display image generating portion 38.

The rearward image generating portion 35 generates the rearward image BG (i.e. the rearward image BG2 in FIG. 5), which shows the vehicle 100 and the surroundings being looked down from above in the vertical direction and which is displayed below the image graphic IG2, which shows the vehicle 100 and which is generated by the image graphic generating portion 36, on the monitor 41. The rearward image BG2, which is generated by the rearward image generating portion 35 and which shows the vehicle 100 and the surroundings from the viewpoint above the vehicle 100 in the vertical direction, is transmitted to the display image generating portion 38.

The display image generating portion 38 displays the image, in which the vehicle 100 and the surroundings being viewed from above in the vertical direction is shown, on the right of the forward image FG1 on the monitor 41. In other words, the forward image FG2, the left side image LG2, the right side image RG2 and the rearward image BG2 are displayed so as to surround the image graphic IG2, which is transmitted to the display image generating portion 38 from the image graphic generating portion 36, on the monitor 41.

Figure 6:
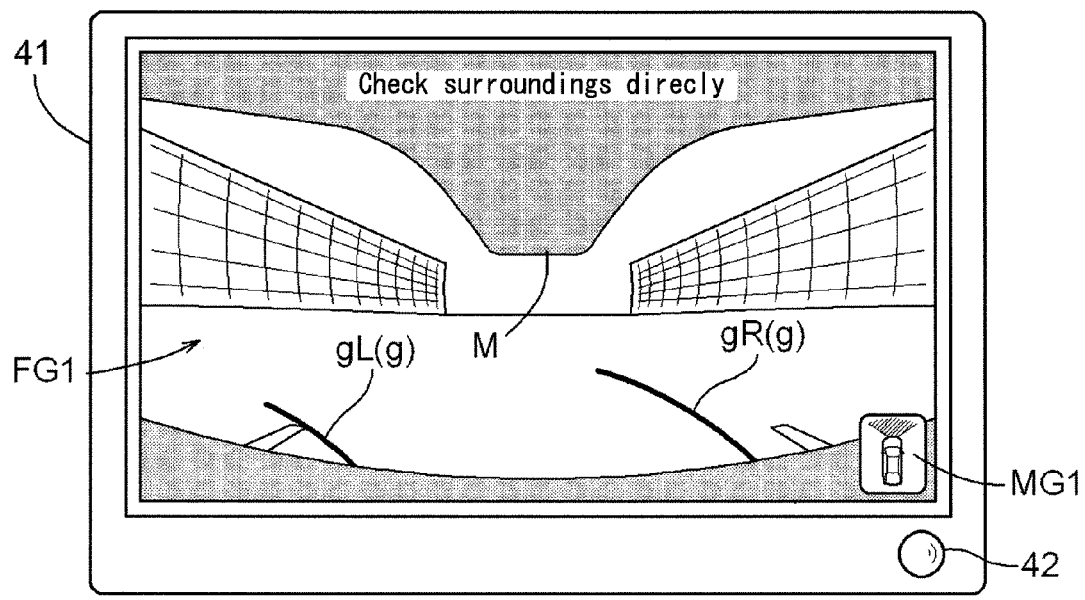
FIG. 6 is a diagram illustrating an example of a display image displaying a forward view of the vehicle while traveling forward.

According to the surroundings monitoring device 50 of the embodiment, only the forward image FG showing the area extending forward relative to the vehicle 100 may be displayed on the monitor 41 in response to the operation of the viewpoint shifting switch 42 by the user (see FIG. 6). More specifically, when the user further presses the viewpoint shifting switch 42, the viewpoint setting portion 32 sets the viewpoint in a forward direction relative to the vehicle 100 as the viewpoint of the display image DG to be displayed on the monitor 41.

The forward image generating portion 33 reads out the capture image CG, which is obtained by the front camera 11 and which is temporarily stored within the capture image obtaining portion 31, in response to the viewpoint set by the viewpoint setting portion 32, in order to generate the forward image FG (i.e. the forward image FG1 in FIG. 6) by using the read-out capture image CG. The upper middle area of the capture image CG obtained from the capture mage obtaining portion 31 may be hidden by means of the mask M, so that the user perceives that the forward image FG1 is displayed on the monitor 41 when the user looks at the monitor 41.

The overview image MG1 showing the minituarized entire vehicle 100 may be displayed (shown) in the vicinity of the forward image FG1 (e.g. the lower right area on the forward image FG1) in order to enable the user to easily recognize which area around the vehicle 100 is shown on the forward image FG1, which is displayed on the monitor 41. For example, the area extending forward relative to the vehicle 100 is emphasized with a color and the like on the overview image MG1. The forward image FG1 generated by the forward image generating portion 33 is transmitted to the display image generating portion 38.

The expected course line generating portion 37 generates the expected course line g, which is obtained by the calculation on the basis of the steering angle of the steering wheel 61, the wheel speeds of the wheels 62, and the shift position of the gear lever 63. The expected course line g is transmitted to the display image generating portion 38. In FIG. 6, the expected course line g (i.e. an expected forward course line) is displayed on the forward image FG1. More specifically, in FIG. 6, a line gL serves as a portion of the expected forward course line so as to be positioned at the left side thereof in the case where the vehicle 100 travels forward. A line gR serves as a portion of the expected forward course line so as to be positioned at the right side relative to the line gL in the case where the vehicle 100 travels forward. Additionally, the end portion of the vehicle 100 on the image may be emphasized with a color and the like. The expected forward course line is transmitted to the display image generating portion 38.

The display image generating portion 38 superimposes the expected forward course line on the forward image FG1 and displays the forward image FG1 and the expected forward course line on the monitor 41. The user may easily perceive the surroundings of the vehicle 100 by referring to the display image DG on the monitor 41. Therefore, the user may properly drive (steer) the vehicle 100. According to the surroundings monitoring device 50 of the embodiment, the image to be displayed on the monitor 41 may be switchable in response to the condition and state of the vehicle 100 and a driving situation by the user pressing the viewpoint shifting switch 42.

For example, in a case where the user further presses the viewpoint shifting switch 42 while the display image DG illustrated in FIG. 6 is displayed on the monitor 41, the display image is switched to the display image DG illustrated in FIG. 4. Alternatively, the viewpoint shifting switch 42 may be configured with a three-stages switching type so as to include three-stage switches corresponding to the display images DG illustrated in FIGS. 4, 5 and 6, respectively.

Figure 7:
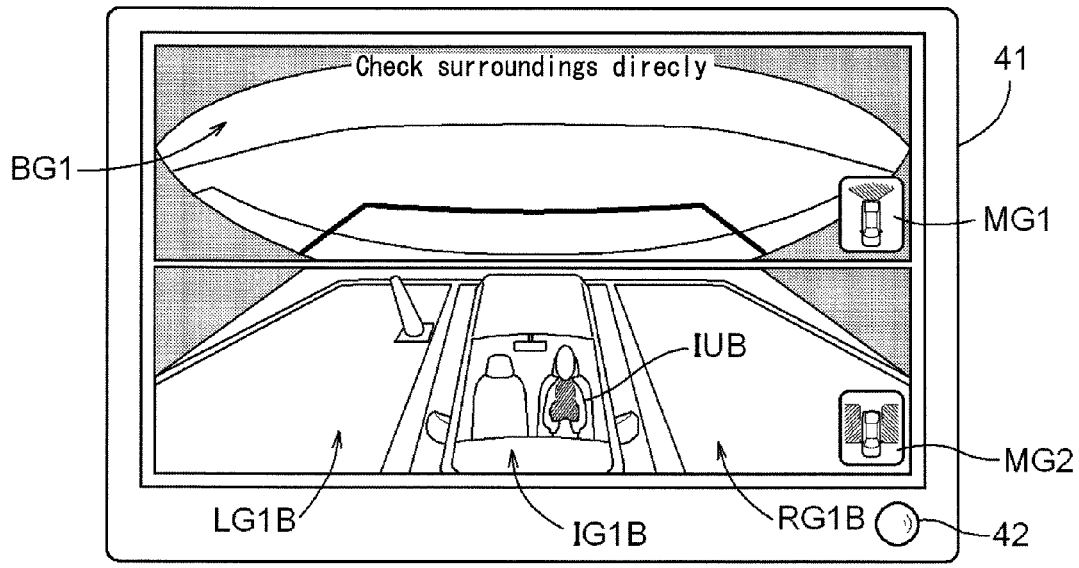
FIG. 7 is a diagram illustrating an example of a display image in a case where the vehicle is viewed from obliquely above the vehicle while traveling rearward.

The display of the display image DG on the monitor 41 will be described below with the display image DG showing the vehicle 100 and the surroundings from the viewpoint obliquely above the vehicle 100 while moving rearward as an example. In the case where the position of the gear lever 63 is determined to be at the rearward moving shift position by means of the shift position sensor 23, the viewpoint setting portion 32 sets the viewpoint of looking down the vehicle 100 from above the front portion thereof towards the rear lower portion thereof (see FIG. 3C) as the viewpoint of the display image DG to be displayed on the monitor 41 in response to the detection result of the shift position sensor 23. The display image DG in this case is illustrated in FIG. 7.

The image graphic generating portion 36 generates the image graphic IG (i.e. the image graphic IG1B in FIG. 7) of the vehicle 100 in response to the viewpoint set by the viewpoint setting portion 32, so that at least a portion of the vehicle 100 and the side mirrors 60 are included in the image graphic IG1B. In this embodiment, an image IUB indicating the user is also generated on the image graphic IG1B, so that the user perceives a position of the vehicle 100 and the surroundings of the vehicle 100 (e.g. the positional relationship between the vehicle 100 and the surroundings) more easily. In this case, the image showing the vehicle 100 and the surroundings being looked down from above a portion of the vehicle 100 in front of the user towards the rear lower portion of the vehicle 100 is generated as the image graphic IG1B. In this case, the mirror image is generated as the image graphic IG1B. The image graphic IG1B generated by the image graphic generating portion 36 (including the image IUB in the case where the image IUB of the user is generated) is transmitted to the display image generating portion 38.

The rearward image generating portion 35 reads out the capture image CG, which is obtained by the rear camera 13 and which is temporarily stored within the capture image obtaining portion 31, in response to the viewpoint set by the viewpoint setting portion 32, in order to generate the rearward image BG (i.e. the rearward image BG1 in FIG. 7) by using the read-out capture image CG. The overview image MG1 showing the miniturized entire vehicle 100 may be displayed (shown) in the vicinity of the rearward image BG1 (e.g. the lower right area on the rearward image BG1) in order to enable the user to easily recognize which area around the vehicle 100 is shown on the rearward image BG1, which is displayed on the monitor 41. For example, an area extending rearward relative to the vehicle 100 is emphasized with a color and the like on the overview image MG1 in FIG. 5. The rearward image BG1 generated by the rearward image generating portion 35 is transmitted to the display image generating portion 38.

The side image generating portion 34 reads out the capture image CG, which is obtained by the left side camera 12a and which is temporarily stored within the capture image obtaining portion 31, in response to the viewpoint set by the viewpoint setting portion 32, in order to generate the left side image LG (i.e. the left side image LG1B in FIG. 7) by using the read-out capture image CG. Furthermore, the side image generating portion 34 reads out the capture image CG, which is obtained by the right side camera 12b and which is tempo-rarily stored within the capture image obtaining portion 31, in response to the viewpoint set by the viewpoint setting portion 31, in order to generate the right side image RG (i.e. the right side image RG1B in FIG. 7) by using the read-out capture image CG.

The overview image MG2 showing the miniturized entire vehicle 100 may be displayed (shown) on the monitor 41 in order to enable the user to easily recognize which areas around the vehicle 100 are shown on the left side image LG1B and the right side image RG1B, respectively. For example, the area extending to the left from the vehicle 100 is emphasized with the color and the like on the left side image LG1B in FIG. 7. Similarly, the area extending to the right from the vehicle 100 is emphasized with the color and the like on the right side image RG1B in FIG. 7.

The pair of the side cameras 12 are provided at the respective side mirrors 60 so as to face downward in the vertical direction. Therefore, the side camera 12 obtains the capture image CG so that an area below the side mirror 60 in the vertical direction is captured as the center of the capture image CG. Accordingly, if the side image generating portion 34 simply displays the capture images CG, which are obtained from the respective left side camera 12a and the right side camera 12b and which are read out from the capture image generating portion 31, on the monitor 41, the user may perceive the views displayed on the monitor 41 with awkwardness. Therefore, in this embodiment, the side image generating portion 33 generates the left side image LG1B and the right side image RG1B. in which the vehicle 100 being looked down from above the front portion thereof towards the rear lower portion thereof is shown, are generated on the basis of the capture images CG, which are read out from the capture image generating portion 31, in the case where the viewpoint of looking down the vehicle 100 from above the front portion thereof towards the lower end portion thereof is set as the viewpoint by the viewpoint setting portion 32. The left side image LG1B and the right side image RG1B may be generated by using a know image processing technology. Therefore, a detailed explanation of generation of the left side image LG1B and the right side image RG1B will be omitted here. The left side image LG1B and the right side image RG1B, which are generated by the side image generating portion 34 and which are images showing the vehicle 100 and the surroundings so as to be looked down from above the front portion of the vehicle 100 towards the rear lower portion thereof, are transmitted to the display image generating portion 38.

In this case, the left side image LG1B and the right side image RG1B may be generated so that an angle of vision thereof substantially corresponds to an angle of vision of the rearward image BG1. The angle of vision refers to an angle of vision relative to a horizontal surface. In other words, the left side image LG1B and the right side image RG1B are generated so that the angle of vision thereof relative to the horizontal surface substantially corresponds to the angle of vision of the rearward image BG1 relative to the horizontal surface. Additionally, the angle of the vision of the left side image LG1B and the right side image RG1B does not need to completely coincide with the angle of vision of the rearward image BG1, but the angle of the vision of the left side image LG1B and the right side image RG1B may be set to be a close angle to the angle of vision of the rearward image BG1.

The display image generating portion 38 displays the image graphic IG1B, which is transmitted to the display image generating portion 38 from the image graphic generating portion 36 and which shows the vehicle 100 and the surroundings from the viewpoint of looking down the vehicle 100 from above the front portion thereof towards the rear lower portion thereof, the left side image LG1B and the right side image RG1B, which are transmitted to the display image generating portion 38 from the side image generating portion 34 and which show the vehicle 100 and the surroundings from the viewpoint of looking down the vehicle 100 from above the front portion thereof towards the rear lower portion thereof, and the rearward image BG1, which is transmitted to the display image generating portion 38 from the rearward image generating portion 35, on the monitor 41. More specifically, the display image generating portion 38 displays the rearward image BG1 above the image graphic IG1B, the left side image LG1B and the right side image RG1B on the monitor 41. Furthermore, the display image generating portion 38 generates the display image DG so that an upper end portion of the left side image LG1B and an upper end portion of the right side image RG1B displayed on the monitor 41 are overlapped with at least an area existing the closest to the vehicle 100 on the rearward image BG1. The upper end portions of the left side image LG1B and the right side image RG1B are upper end portions thereof when being displayed on the monitor 41. The area, which is included, at least, in the rearward image BG1 and which exists the closest to the vehicle 100 on the rearward image BG1, corresponds to an area in the vicinity of a lower end portion on the rearward image BG1 in FIG. 7. The display image generating portion 38 generates the display image DG so that the upper end portions of the respective left side image LG1B and the right side image RG1B are overlapped with the area in the vicinity of the lower end portion of the rearward image BG1. In the case where the display image DG, which is generated as mentioned above, is displayed on the monitor 41, the rearward image BG1, the left side image LG1B and the right side image RG1B are showed so that the moving direction of the vehicle 100 on each image coincides therebetween. Therefore, the left side image LG1B and the rearward image BG1 are shown as sequential images. Furthermore, the right side image RG1B and the rearward image BG1 are shown as sequential images. Accordingly, the user may smoothly shift his/her vision between images (i.e. the user may properly perceive the images shown on the monitor 41 without being confused).

Figure 8:
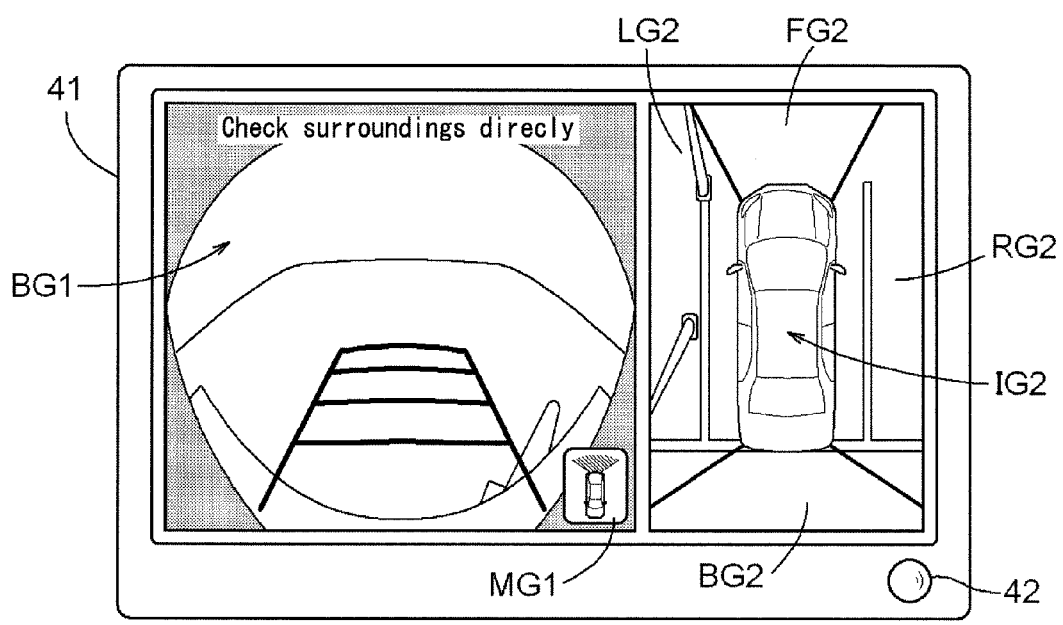
FIG. 8 is a diagram illustrating an example of a display image in a case where the vehicle is viewed from vertically above the vehicle while traveling rearward.

According to the surroundings monitoring device 50 of the embodiment, the viewpoint is switchable from the viewpoint obliquely above the vehicle 100 as illustrated in FIG. 3C to the viewpoint above the vehicle 100 in the vertical direction as illustrated in FIG. 3B. The switching of the viewpoint may be achieved in response to the operation of the viewpoint shifting switch 42 by the user. For example, when the user presses the viewpoint shifting switch 42, the viewpoint setting portion 32 sets the viewpoint above the vehicle 100 in the vertical direction as the viewpoint of the display image DG to be displayed on the monitor 41. The viewpoint on the display image DG will be described in more detail below with reference to FIG. 8.

The image graphic generating portion 36 generates the image graphic IG (i.e. the image graphic IG2 in FIG. 8) of the vehicle 100 so that the vehicle 100 being viewed from above in the vertical direction is shown in the image graphic IG2, in response to the viewpoint set by the viewpoint setting portion 32. The image graphic IG2 generated by the image graphic generating portion 36 is transmitted to the display image generating portion 38.

The rearward image generating portion 35 reads out the capture image CG, which is captured by the rear camera 13 and which is temporarily stored within the capture image obtaining portion 31, in response to the viewpoint set by the viewpoint setting portion 32, in order to generate the rearward image BG (i.e. the rearward image BG1 in FIG. 8) by using the read-out capture image CG. The overview image MG1 showing the minituarized entire vehicle 100 may be displayed (shown) in the vicinity of the rearward image BG1 (e.g. the lower right area on the rearward image BG1) in order to enable the user to easily recognize which area around the vehicle 100 is shown on the rearward image BG1, which is displayed on the monitor 41. For example, the area extending rearward relative to the vehicle 100 is emphasized with the color and the like on the overview image MG1 in FIG. 5. The rearward image BG1 generated by the rearward image generating portion 35 is transmitted to the display image generating portion 38.

Furthermore, the rearward image generating portion 35 generates the rearward image BG (i.e. the rearward image BG2 in FIG. 8), which shows the vehicle 100 and the surroundings being viewed from above the vehicle 100 in the vertical direction and which is to be displayed below the image graphic IG2 of the vehicle 100 generated by the image graphic generating portion 36 on the monitor 41. The rearward image BG2, which is generated by the rearward image generating portion 35 and which shows the vehicle 100 and the surroundings from above the vehicle 100 in the vertical direction, is transmitted to the display image generating portion 38.

The side image generating portion 34 reads out the capture image CG, which is obtained by the left side camera 12a and which is temporarily stored within the capture image obtaining portion 31, in response to the viewpoint set by the viewpoint setting portion 32, in order to generate the left side image LG (i.e. the left side image LG2 in FIG. 8) by using the read-out capture image CG. Furthermore, the side image generating portion 34 reads out the capture image CG, which is obtained by the right side camera 12b and which is temporarily stored within the capture image obtaining portion 31, in response to the viewpoint set by the viewpoint setting portion 32, in order to generate the right side image RG (i.e. the right side image RG2 in FIG. 8) by using the read-out capture image CG. The left side image LG2 generated by the side image generating portion 34 is displayed on the left of the image graphic IG2 of the vehicle 100 generated by the image graphic generating portion 36. The right side image RG2 generated by the side image generating portion 34 is displayed on the right of the image graphic IG2. The left side image LG2 and the right side image RG2 generated by the side image generating portion 34 are transmitted to the display image generating portion 38.

The side image generating portion 33 generates the forward image FG (i.e. the forward image FG2 in FIG. 8), which shows the vehicle 100 and the surroundings being viewed from above the vehicle 100 in the vertical direction and which is to be displayed above the image graphic IG2 of the vehicle 100 generated by the image graphic generating portion 36. The forward image FG2 showing the view extending forward relative to the vehicle 100 from the viewpoint above the vehicle 100 in the vertical direction is transmitted to the display image generating portion 38.

The display image generating portion 38 displays the view showing the surroundings of the vehicle 100 being viewed from above in the vertical direction on the right of the rearward image BG1 on the monitor 41. In other words, the image graphic IG2, the forward image FG2, the left side image LG2, the right side image RG2 and the rearward image BG2 are displayed on the monitor 41 so that the image graphic IG2, which is transmitted to the display image generating portion 38 from the image graphic generating portion 36, is surrounded by the forward image FG2, the left side image LG2, the right side image RG2 and the rearward image BG2.

Figure 9:
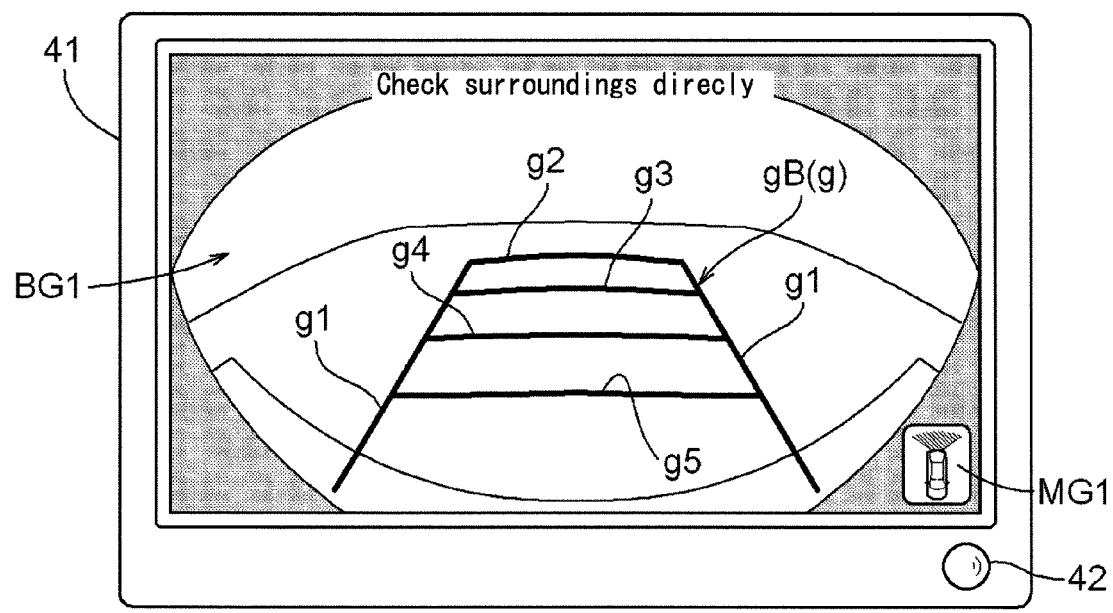
FIG. 9 is a diagram illustrating a rear view of the vehicle while traveling rearward.

The surroundings monitoring device 50 may be configured so as to display only the rearward image BG showing the view extending rearward of the vehicle 100 on the monitor 41 in response to the operation of the viewpoint shifting switch 42 by the user (see FIG. 9). For example, when the user further presses the viewpoint shifting switch 42, the viewpoint setting portion 38 sets the viewpoint in a rear direction relative to the vehicle 100 as the viewpoint of the display image DG to be displayed on the monitor 41.

The rearward image generating portion 35 reads out the capture image CG, which is obtained by the rear camera 13 and which is temporarily stored within the capture image generating portion 31, in response to the viewpoint set by the viewpoint setting portion 32, in order to generate the rearward image BG (i.e. the rearward image BG1 in FIG. 9) by using the read-out capture image CG. The overview image MG1 showing the minituarized entire vehicle 100 may be displayed (shown) in the vicinity of the rearward image BG1 (e.g. at the lower right area on the rearward image BG1) in order to enable the user to easily recognize which area around the vehicle 100 is shown on the rearward image BG1, which is displayed on the monitor 41. For example, the area extending rearward relative to the vehicle 100 is emphasized with the color and the like on the overview image MG1. The rearward image BG1 generated by the rearward image generating portion 35 is transmitted to the display image generating portion 38.

The expected course line generating portion 37 generates the expected course line g, which is obtained by the calculation on the basis of the steering angle of the steering wheel 61, the wheel speeds of the wheels 62, and the shift position of the gear lever 63. The expected course line g is transmitted to the display image generating portion 38. More specifically, the expected course line g (i.e. an expected rearward course line gB) is displayed on the rearward image BG1 in FIG. 9. The expected rearward course line gB is a reference indicating an expected trajectory and the like of the rear end portion of the vehicle 100 in response to the steering angle of the vehicle 100, which is moved rearwardly. In this embodiment, the expected rearward course line gB is configured with an expected rearward trajectory line g1 and distance reference lines g2, g3 and g4, which are displayed behind the vehicle 100 on the monitor 41. More specifically, in this embodiment, the distance reference g2 serves as a reference line distant from the vehicle 100 by five meters, the reference line g3 serves as a reference line distant from the vehicle 100 by three meters, and the reference line g4 serves as a reference line distant from the vehicle 100 by one meter and as an attention line. For example, the expected rearward course line gB is indicated by basically a yellow color, except that the reference line g4 distant from the vehicle 100 by one meter and serving as the attention line and an expected rearward course line g5 shown on the display image DG so as to be positioned closer to the vehicle 100 relative to the reference line g4 are indicated by, for example, a red color in order to draw an attention of the driver. The expected rearward course line gB is transmitted to the display image generating portion 38.

The display image generating portion 38 superimposes the expected rearward course line gB on the rearward image BG1, so that the rearward image GB1 and the expected rearward course line gB are displayed on the monitor 41. The user may easily perceive the surroundings of the vehicle 100 by referring to the display image DG. Therefore, the vehicle 100 may be appropriately operated. According to the surroundings monitoring device 50 of the embodiment, the images to be displayed on the monitor 41 are switchable in response to the operation of the viewpoint shifting switch 42 by the user, so that the image suitable to the condition and the situation of driving and circumstances is displayed on the monitor 41. In the case where the user presses the viewpoint shifting switch 42 while the display image DG illustrated in FIG. 9 is displayed on the monitor 41, the image may be switched to the display image DG illustrated in FIG. 7. Alternatively, the viewpoint shifting switch 42 may be configured with the three-stages switching type so as to include the three-stage switches corresponding to the display images DG illustrated in FIGS. 7, 8 and 9, respectively.

OTHER EMBODIMENTS

In the above-described embodiment, the image graphic generating portion 36 generates the image graphic IG of the vehicle 100, which shows the vehicle 100 being viewed from above the rear portion thereof towards the front lower portion thereof so that at least a portion of the vehicle 100 and the side mirrors 60 are included in the image graphic IG, or the image graphic IG of the vehicle 100, which shows the vehicle 100 being viewed from above the front portion thereof towards the rear lower portion thereof so that at least a portion of the vehicle 100 and the side mirrors 60 are included on the image graphic IG. Alternatively, the image graphic generating portion 100 may be configured so as to generate, for example, an image graphic IG including the entire vehicle 100, as long as at least a portion of the vehicle and the side mirrors 60 are included in the image graphic IG. In this case, because the image graphic generating portion 36 generates the image graphic IG including the entire vehicle 100, the side mirrors 60 are surely included in the image graphic IG. Accordingly, because the image graphic IG is generated so as to include the side mirrors 60, the user may easily perceive a positional relationship between the vehicle 100 and an object existing around the vehicle 100.

In the above-described embodiment, the pair of the side cameras 12 are provided at the vehicle 100 so as to face downward in the vertical direction. Alternatively, the side cameras 12 may be provided at the vehicle 100 so as to face other directions different from the downwardly vertical direction. Even in this case, the side image generating portion 34 may generate the left side image LG and the right side image RG on the basis of the capture images CG obtained by the side cameras 12, respectively, so as to correspond to the viewpoint set by the viewpoint setting portion 32.

In the above-described embodiment, the forward image FG1, which is generated on the basis of the capture image CG obtained by the front camera 11, is displayed above the image graphic IG1F, the left side image LG1F and the right side image RG1F in the case where the gear lever 63 of the vehicle 100 is positioned at, at least, the forward moving shift position. Alternatively, the surroundings monitoring device 50 may be configured so that the forward image FG1, which is generated on the basis of the capture image CG obtained by the front camera 11, is displayed above the image graphic IG1F, the left side image LG1F and the right side image RG1F in the case where the gear lever 63 is positioned at the rearward moving shift position. In this case, the surroundings monitoring device 50 may be configured so as to switch the viewpoint in response to the operation of the viewpoint shifting switch 42 by the user.

In the above-described embodiment, the rearward image BG1, which is generated on the basis of the capture image CG obtained by the rear camera 13, is displayed above the image graphic IG1B, the left side image LG1B and the right side image RG1B in the case where the gear lever 63 of the vehicle 100 is positioned at, at least, the rearward moving shift position. Alternatively, the surroundings monitoring device 50 may be configured so that the rearward image BG1, which is generated on the basis of the capture image CG obtained by the rear camera 13, is displayed above the image graphic IG1B, the left side image LG1B and the right side image RG1B in the case where the gear lever 63 is positioned at the forward moving shift position. In this case, the surroundings monitoring device 50 may be configured so as to switch the viewpoint in response to the operation of the viewpoint shifting switch 42 by the user.

In the above-described embodiment, the image graphic IG1B obtained in the case where the gear lever 63 is positioned at the rearward moving shift position is generated as the mirror image. Alternatively, the image graphic IG1B may be generated as the normal image even in the case where the gear lever 63 is positioned at the rearward moving shift position.

In the above-described embodiment, the angle of vision of the left side image LG1B and the right side image RG1B substantially correspond to the angle of vision of the rearward image BG1. Alternatively, the angle of vision of the left side image LG1B and the right side image RG1B may be set so as to differ from the angle of vision of the rearward image BG1.

In the above-described embodiment, the display image DG is generated so that the upper end portions of the respective left side image LG1F and the right side image RG1F, which are displayed on the monitor 41, are overlapped with at least the area existing the closest to the vehicle 100 on the forward image FG1. Furthermore, in the above-described embodiment, the display image DG is generated so that the upper end portions of the respective left side image LG1B and the right side image RG1B displayed on the monitor 41 are overlapped with, at least, the area existing the closest to the vehicle 100 on the rearward image BG1. In those cases, a known morphing processing may be executed to the left side image LG1F (LG1B), the right side image RG1F (RG1B) and the forward image FG1 (the rearward image RG1B), so that the left side image LG1F (LG1B), the right side image RG1F (RG1B) and the forward image FG1 (the rearward image RG1B) are smoothly connected with each other at connected portions therebetween (e.g. border portions therebetween). Alternatively, the display image DG may be generated so that the left side image LG1F (LG1B), the right side image RG1F (RG1B) and the forward image FG1 (the rearward image RG1B) are not overlapped with one another.

In the above-described embodiment, the viewpoint of the display image DG is switchable in response to the operation of the viewpoint shifting switch 42. The viewpoint shifting switch 42 does not need to be configured as a physical switch. For example, the viewpoint shifting switch 42 may be configured as a touch panel display so as to be displayed on the monitor 41 as touch button(s).

In the above-described embodiment, the expected course line g is superimposed on the forward image FG1 illustrated in FIG. 6 in the case where only the forward image FG1 is displayed on the monitor 41. Similarly, the expected course line g is superimposed on the rearward image BG1 illustrated in FIG. 9 in the case where only the rearward image BG1 is displayed on the monitor 41. Alternatively, the expected course line g may be superimposed and shown on the forward image FG1 illustrated in FIG. 4, the forward image FG1 illustrated in FIG. 5, the rearward image BG1 illustrated in FIG. 7 and the rearward image BG1 illustrated in FIG. 8. Furthermore, the expected course line g may be superimposed on the left side image LG and the right side image RG.

In the above-described embodiment, the image IUF indicating the user is generated on the image graphic IG1F, so that the user easily perceives the position of the vehicle 100 and surroundings. Furthermore, the image IUB indicating the user is generated on the image graphic IG1B so that the user easily perceives the position of the vehicle 100 and surroundings. Alternatively, the surroundings monitoring device 50 may be modified so as not to generate the images IUF and IUB.

In the above-described embodiment, the image IUB indicating the user is generated on the image graphic IG1B, so that the user easily perceives the position of the vehicle 100 and surroundings. However, the surroundings monitoring device 50 of the embodiment may be modified so as to generate a mirror writing of "L" on the left side image LG1B and a mirror writing of "R" on the right side image RG1B, or the like, so that the mirror writings "L" and "R" or the like are displayed on the display image DG, instead of generating the image IUG on the image graphic IG1B. In this case, the user may perceive that a display image HG displayed on the monitor 41 while the vehicle 100 is moving rearwardly is a mirror image.

Accordingly, the surroundings monitoring device 50 for the vehicle that properly displays the vehicle 100 and the surroundings without confusing the user may be achieved at lower manufacturing costs.

Accordingly, because the display image DG showing the vehicle 100 (a portion of the vehicle 100) and the surroundings being viewed from above the rear portion thereof or from above the front portion thereof is displayed on the monitor 41, the object existing around the vehicle 100 may be avoided from being displayed on the monitor 41 as if the object is unnaturally stretched. Furthermore, because the image graphic IG to be displayed on the monitor 41 is generated so as to include the side mirrors 60, which are not included in the capture image CG, the user may easily perceive the positional relationship between the vehicle 100 and the object existing around the vehicle 100. Accordingly, the user may perceive the circumstances around the vehicle 100 without being confused. Furthermore, because the surroundings monitoring device 50 of the embodiment is achievable with additional side cameras 12 on the left and right side mirrors 60, respectively, the surroundings monitoring device 50 may be provided at lower manufacturing costs.

According to the embodiments, the surroundings monitoring device 50 further includes the front camera 11 for obtaining the capture image CG capturing the view extending forward relative to the vehicle 100. The forward image FG, which is generated on the basis of the capture image CG obtained by the front camera 11, is displayed above the image graphic IG, the left side image LG and the right side image RG on the display 41 in the case where the gear lever 63 of the vehicle 100 is positioned at, at least, the forward moving shift position.

Accordingly, the display image DG may be generated so that a moving direction on the forward image FG, which changes in response to a movement of the vehicle 100, coincides with a moving direction on each of the left side image LG and the right side image RG, which change in response to the movement of the vehicle 100. Accordingly, the user may easily recognize a relationship between the forward image FG on the one hand and the left side image LG and the right side image RG on the other. As a result, the user may properly perceive the circumstances around the vehicle 100 without being confused.

According to the embodiments, the surroundings monitoring device 50 further includes the rear camera 13 for obtaining the capture image CG capturing the view extending rearward relative to the vehicle 100. The rearward image BG, which is generated on the basis of the capture image CG obtained by the rear camera 12, is displayed above the image graphic IG, the left side image LG and the right side image RG on the display 41 in the case where the gear lever 63 of the vehicle 100 is positioned at, at least, the rearward moving shift position.

Accordingly, the display image DG may be generated so that a moving direction on the rearward image BG, which changes in response to the movement of the vehicle 100, coincides with the moving direction on each of the left side image LG and the right side image RG, which change in response to the movement of the vehicle 100. Accordingly, the used may easily recognize a relationship between the rearward image FG on the one hand and the left side image LG and the right side image RG on the other. As a result, the user may properly perceive the circumstances around the vehicle 100 without being confused.

According to the embodiments, the image graphic IG generated in the case where the gear lever 63 is positioned at the rearward moving shift position is displayed on the monitor 41 as the mirror image.

Generally, the rearward image BG is displayed as the mirror image as if the view extending rearwardly of the vehicle 100 is reflected on a rearview mirror. Therefore, the left side view LG and the right side view RG may also be displayed on the monitor 41 as the mirror images, so that the user may properly recognize the relationship between the rearward image BG on the one hand and the left side image LG and the right side image RG on the other. Furthermore, in the case where the left side view LG and the right side view RG are displayed on the monitor 41 as the mirror images, the positional relationship between the left and right relative to the vehicle 100 in a real place may conform with the positional relationship between the left and the right relative to the vehicle 100 on the display image DG displayed on the monitor 41. Accordingly, the user may easily perceive the positional relationship between the vehicle 100 and the object existing around the vehicle 100.

According to the embodiments, the angle of vision of the left side image LG and the right side image RG is set so as to substantially coincide with the angle of vision of the rearward image BG.

Accordingly, because the angle of vision of the left side image LG and the right side image RG is set to substantially correspond to the angle of vision of the rearward image BG, the rearward image BG, the left side image LG and the right side image RG may be smoothly connected. As a result, the user may smoothly shift his/her vision between the rearward image BG, the left side image LG and the right side image RG without being confused.

According to the embodiments, the left side image LG, the right side image RG and the forward image FG to be displayed on the monitor 41 are generated so that the upper end portion of the left side image LG and the upper end portion of the right side image RG, which are displayed on the monitor 41, are overlapped with, at least, the area existing the closest to the vehicle 100 on the forward image FG.

Accordingly, the forward image FG, the left side image LG and the right side image RG are smoothly connected, so that the user may easily perceive the circumstances around the vehicle 100.

According to the embodiments, the left side image LG, the right side image RG and the rearward image BG to be displayed on the monitor 41 are generated so that the upper end portion of the left side image LG and the upper end portion of the right side image RG, which are displayed on the monitor 41, are overlapped with, at least, the area existing the closest to the vehicle 100 on the rearward image BG.

Accordingly, the rearward image BG, the left side image LG and the right side image RG are smoothly connected, so that the user may easily perceive the circumstances around the vehicle 100.

According to the embodiments, the left and right side cameras 12a and 12b are provided at the respective left and right side mirrors 60a and 60b so as to face downward in the vertical direction.

According to the embodiments, the image (IUF, IUB) indicating the user is included in the image graphic IG of the vehicle 100.

Accordingly, for example, in the case where the side cameras 12 having the fisheye lenses, respectively, are used for the surroundings monitoring device 50, each of the side cameras 12 may obtain the side image capturing a view extending from in the vicinity of the front portion of vehicle 100 to in the vicinity of the rear portion thereof. In other words, because the surroundings monitoring device 50 only needs to include the side cameras 12 at the left and right portions of the vehicle 100, respectively, the surroundings monitoring device 50 may be achieved at lower manufacturing costs.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the present invention as defined in the claims, be embraced thereby.

The invention claimed is:

1. A surroundings monitoring system for a vehicle, comprising:
   a front camera provided at a front portion of the vehicle, the front camera capturing a forward view relative to the vehicle;
   a rear camera provided at a rear portion of the vehicle, the rear camera capturing a rearward view relative to the vehicle;
   a forward image generator generating a forward image based on the forward view captured by the front camera;
   a rearward image generator generating a rearward image based on the rearward view captured by the rear camera;
   a pair of side cameras provided at a left side mirror and a right side mirror of the vehicle, respectively, for obtaining capture images capturing views extending to left and right of the vehicle including views below the left and right side mirrors in a vertical direction, respectively;
   an image graphic generator generating an image graphic of the vehicle based on a viewpoint set based on a detected position of a gear lever of the vehicle and including at least a portion of the vehicle and the left and right side mirrors on the image graphic;
   a side image generator generating a left side image based on the capture image capturing the view extending to the left of the vehicle so as to correspond to an image shown at a left portion of the image graphic, and generating a right side image based on the capture image capturing the view extending to the right of the vehicle so as to correspond to an image shown at a right portion of the image graphic; and a first image comprising the forward image or the rearward image, and a second image comprising the image graphic of the vehicle, the left side image and the right side image, wherein the image graphic of the vehicle, the left side image and the right side image are shown so that a moving direction of the vehicle coincides between the image graphic of the vehicle, the left side image and the right side image;

wherein, in the case where the gear lever of the vehicle is detected to be positioned at a forward moving shift position, the viewpoint is set such that the forward image is read out as the first image and the image graphic generator generates the image graphic of the vehicle showing the vehicle being viewed obliquely downward from above a rear portion of the vehicle downward towards a front portion of the vehicle; and in the case where the gear lever of the vehicle is detected to be positioned at a rearward moving shift position, the viewpoint is set such that the rearward image is read out as the first image and the image graphic generator generates the image graphic of the vehicle showing the vehicle being viewed obliquely downward from above a front portion of the vehicle downward towards a rear portion of the vehicle; and displaying on a monitor, which is provided within a compartment of the vehicle, the read out first image displayed above the second image such that the first image and the second image are provided spaced apart from one another on the monitor so that the first image and the second image are respectively displayed independently wherein an upper end portion of the left side image and an upper end portion of the right side image are overlapped with at least an area existing closest to the vehicle on the first image and a moving direction of the first image and the second image coincide to move in accordance with a direction of movement of the vehicle.

2. The surroundings monitoring system for the vehicle according to claim 1, wherein the image graphic generated in the case where the gear lever is positioned at the rearward moving shift position is displayed on the monitor as a mirror image.

3. The surroundings monitoring system for the vehicle according to claim 1, wherein an angle of vision of the left side image and the right side image is set so as to coincide with an angle of vision of the rearward image.

4. The surroundings monitoring system for the vehicle according to claim 1, wherein the left side image, the right side image and the forward image to be displayed on the monitor are generated so that an upper end portion of the left side image and an upper end portion of the right side image, which are displayed on the monitor, are overlapped with, at least, an area existing the closest to the vehicle on the forward image.

5. The surroundings monitoring system for the vehicle according to claim 1, wherein the left side image, the right side image and the rearward image to be displayed on the monitor are generated so that an upper end portion of the left side image and an upper end portion of the right side image, which are displayed on the monitor, are overlapped with, at least, an area existing the closest to the vehicle on the rearward image.

6. The surroundings monitoring system for the vehicle according to claim 1, wherein the pair of the side cameras, each of which is provided at a corresponding side mirror, is arranged so as to face downward in a vertical direction.

7. The surroundings monitoring system for the vehicle according to claim 1, wherein an image indicating a user is included in the image graphic of the vehicle.

* * * * *